US008955250B2

(12) United States Patent
Johnson et al.

(10) Patent No.: US 8,955,250 B2
(45) Date of Patent: Feb. 17, 2015

(54) BREAKAWAY BRACKET FOR USE WITH MODULAR TREE GUARD

(75) Inventors: Kimberly Johnson, New York, NY (US); Bruce Bagley, Toronto (CA)

(73) Assignee: Curb Allure LLC, New York, NY (US)

( * ) Notice: Subject to any disclaimer, the term of this patent is extended or adjusted under 35 U.S.C. 154(b) by 212 days.

(21) Appl. No.: 13/438,840

(22) Filed: Apr. 3, 2012

(65) Prior Publication Data

US 2012/0247012 A1  Oct. 4, 2012

Related U.S. Application Data

(63) Continuation-in-part of application No. 13/079,803, filed on Apr. 4, 2011.

(51) Int. Cl.
*A01G 13/02* (2006.01)
*E04H 17/16* (2006.01)
*A01G 13/00* (2006.01)
(Continued)

(52) U.S. Cl.
CPC .......... *E04H 17/166* (2013.01); *A01G 13/0225* (2013.01); *E04H 2017/006* (2013.01); *E04H 2017/1452* (2013.01)
USPC ........... 47/32.4; 47/66.1; 256/65.03; 248/548

(58) Field of Classification Search
USPC ................ 47/32.4, 32.5, 33, 66.1, 32, 39, 40, 47/66.6, 73, 67, 68; 256/65.03, 65.07; 403/2; 40/607.09; 248/548, 549, 900
See application file for complete search history.

(56) References Cited

U.S. PATENT DOCUMENTS

| 110,091 | A | 12/1870 | Trumbull |
| 1,031,941 | A | 7/1912 | Lanham |
| 1,160,728 | A | 11/1915 | Liggett |

(Continued)

FOREIGN PATENT DOCUMENTS

| CA | 2092865 A1 | 9/1994 |
| EP | 1 353 026 A2 | 10/2003 |

(Continued)

OTHER PUBLICATIONS

Interlaken Planting Fence System, U.S. Patent Pending © 2010 Iron Age Designs, www.ironagegrates.com.

(Continued)

*Primary Examiner* — Rob Swiatek
*Assistant Examiner* — Lisa Tsang
(74) *Attorney, Agent, or Firm* — Mauriel Kapouytian Woods LLP; Andrew A. Noble; Michael Mauriel

(57) ABSTRACT

Various embodiments related to a tree guard are disclosed. One embodiment provides an L shaped breakaway bracket for use with a modular tree guard assembly. The L shaped breakaway bracket includes a horizontal member extending substantially perpendicularly from a vertical member, wherein the vertical member is thinner and longer than the horizontal member. At least one fastener hole is provided in the horizontal member for receiving a fastener for securing the horizontal member to a rail. At least one fastener hole is provided in the vertical member for receiving a fastener for securing the vertical member to a post. The breakaway bracket is adapted to break along the intersection of the horizontal member and the vertical member and separate the rail from the post when a force that would otherwise be sufficient to deform the rail is applied to the rail.

22 Claims, 26 Drawing Sheets

(51) Int. Cl.
  *E04H 17/00* (2006.01)
  *E04H 17/14* (2006.01)

(56) References Cited

U.S. PATENT DOCUMENTS

| | | | |
|---|---|---|---|
| 3,037,593 A | | 6/1962 | Webster |
| 3,506,243 A | * | 4/1970 | Seiler ............................. 256/59 |
| 3,820,906 A | * | 6/1974 | Katt ................................. 403/2 |
| 3,918,686 A | | 11/1975 | Knott et al. |
| 4,283,034 A | * | 8/1981 | Sheehan ...................... 248/263 |
| 4,369,953 A | | 1/1983 | Greiner et al. |
| D268,084 S | | 3/1983 | Haggard |
| D270,609 S | | 9/1983 | Haggard |
| 4,623,128 A | | 11/1986 | Dutch et al. |
| 4,642,938 A | | 2/1987 | Georges et al. |
| 4,684,108 A | | 8/1987 | Bergagnini |
| 5,004,366 A | | 4/1991 | Simmons |
| 5,016,388 A | | 5/1991 | Burress et al. |
| 5,064,162 A | * | 11/1991 | Jondelius ..................... 248/548 |
| 5,231,793 A | | 8/1993 | Allen |
| 5,255,897 A | | 10/1993 | Pepper |
| 5,882,001 A | | 3/1999 | Reinbold |
| 5,938,184 A | * | 8/1999 | DeSouza ........................ 256/19 |
| D422,885 S | | 4/2000 | Marino et al. |
| D423,626 S | | 4/2000 | Marino et al. |
| D428,798 S | | 8/2000 | Marino et al. |
| 6,108,970 A | | 8/2000 | Ball |
| 6,138,993 A | | 10/2000 | Mitchell, Jr. et al. |
| 6,202,367 B1 | | 3/2001 | Marino et al. |
| D444,579 S | | 7/2001 | Emalfarb |
| 6,254,064 B1 | | 7/2001 | Gibbs |
| 6,274,822 B1 | * | 8/2001 | Light et al. ................... 174/260 |
| 6,283,456 B1 | | 9/2001 | Benz et al. |
| 6,311,428 B1 | | 11/2001 | Marino et al. |
| 6,409,156 B2 | | 6/2002 | Dent |
| 6,588,144 B1 | | 7/2003 | Staggs |
| 6,648,304 B1 | | 11/2003 | Zhu |
| 6,719,276 B1 | | 4/2004 | Bush |
| 6,827,517 B2 | * | 12/2004 | Thomson et al. ................. 403/2 |
| 6,866,251 B2 | | 3/2005 | Rosaen |
| 6,986,222 B1 | | 1/2006 | Cochran |
| D518,419 S | | 4/2006 | Smith |
| 7,025,335 B2 | | 4/2006 | Zhu |
| D522,664 S | | 6/2006 | Leone et al. |
| 7,216,854 B2 | | 5/2007 | Bryan |
| 7,240,637 B2 | | 7/2007 | Rosen |
| 7,347,412 B2 | | 3/2008 | Zhu |
| 7,500,654 B2 | | 3/2009 | Rosaen |
| 7,568,680 B2 | * | 8/2009 | Platt .......................... 256/65.04 |
| D620,128 S | | 7/2010 | Gibbs |
| 7,748,681 B2 | * | 7/2010 | Dent ............................ 248/548 |
| 8,038,126 B1 | * | 10/2011 | Albritton ..................... 256/13.1 |
| 2004/0211115 A1 | | 10/2004 | Smith |
| 2006/0118771 A1 | | 6/2006 | Stein et al. |
| 2007/0158526 A1 | * | 7/2007 | Platt ............................. 248/519 |
| 2008/0256856 A1 | | 10/2008 | Rosaen |
| 2009/0140227 A1 | | 6/2009 | Cantatore |
| 2009/0199466 A1 | | 8/2009 | Rosaen |
| 2009/0302288 A1 | * | 12/2009 | James .......................... 256/13.1 |
| 2010/0025648 A1 | | 2/2010 | Walpole et al. |
| 2010/0122664 A1 | | 5/2010 | Weatherbee, Jr. |

FOREIGN PATENT DOCUMENTS

| | | |
|---|---|---|
| FR | 2 867 215 A3 | 9/2005 |
| GB | 2435055 B | 4/2008 |
| WO | WO 2007/135475 A2 | 12/2007 |

OTHER PUBLICATIONS

European Search Report and European Search Opinion issued in corresponding European Application No. 12767288.9 dated Aug. 21, 2014.

* cited by examiner

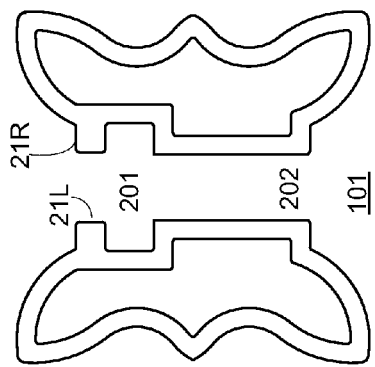
FIG. 5a
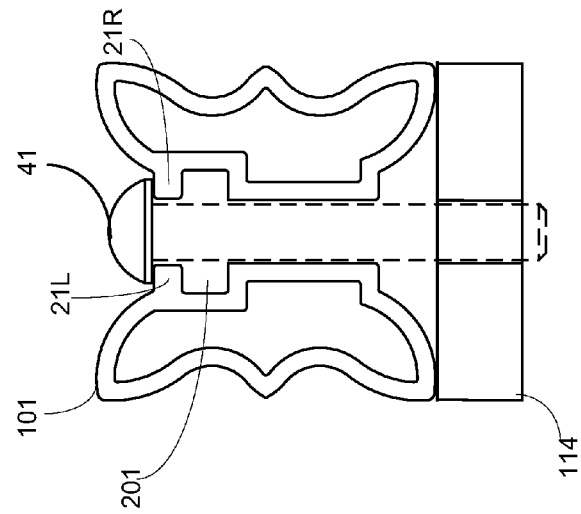
FIG. 5b
FIG. 5d
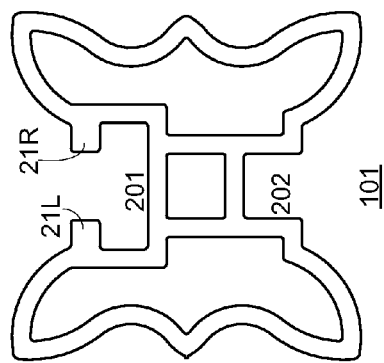
FIG. 5c
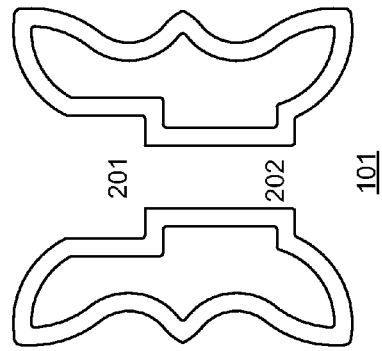

107

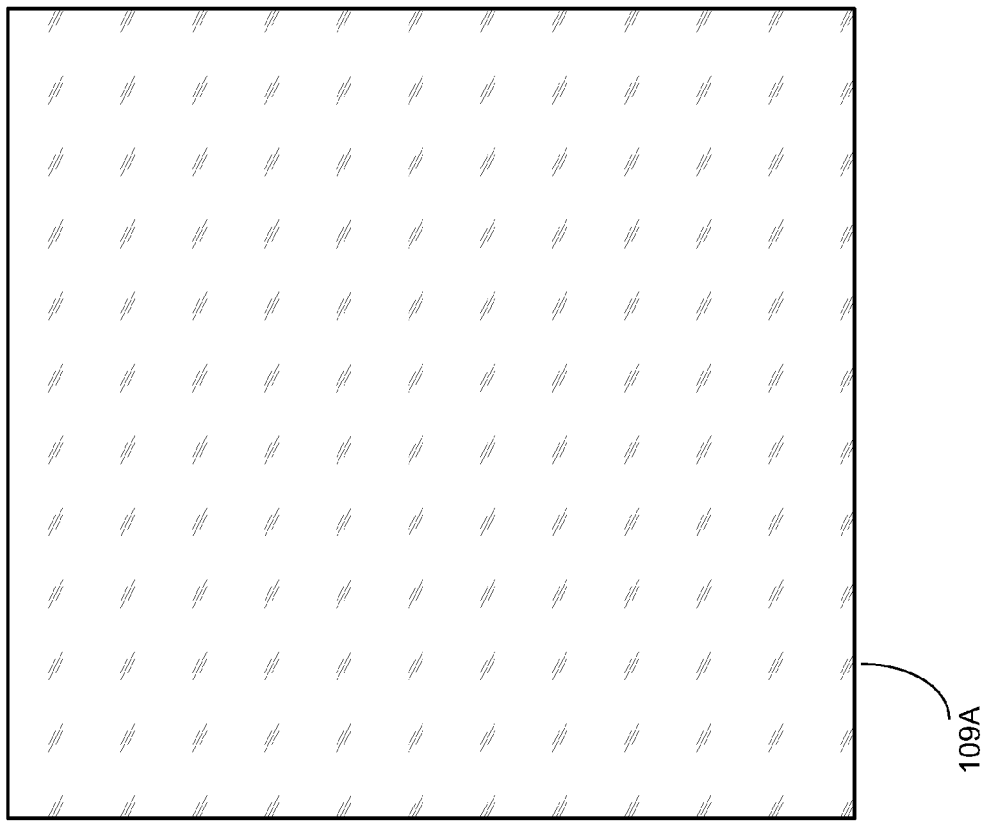
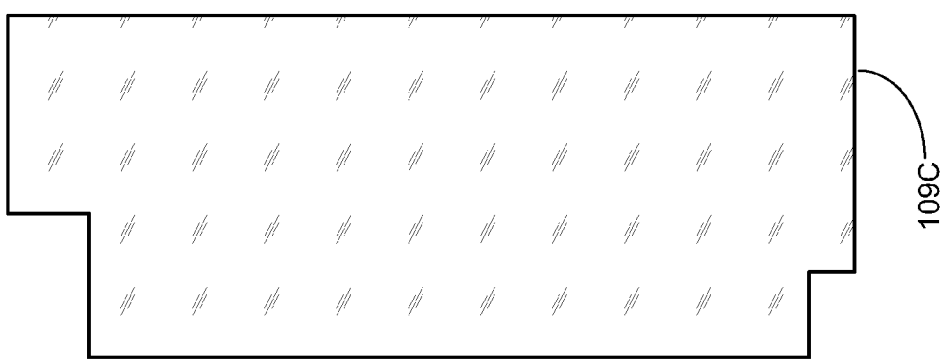
FIG. 8

BREAKAWAY BRACKET FOR USE WITH MODULAR TREE GUARD

CROSS REFERENCE TO RELATED APPLICATIONS

This application is a continuation-in-part of U.S. application Ser. No. 13/079,803 filed Apr. 4, 2011, which is hereby incorporated by reference in its entirety.

BACKGROUND

This invention relates generally to the area of tree guards. Tree guards are typically short fences or other structures that surround the base of street trees that are planted in tree pits in the sidewalk or on grassy boulevards. Tree guards are especially important in urban areas. The urban environment presents many challenges to trees. Abrasion from car doors or bicycle chain locks can damage the bark and leave the tree more vulnerable to disease. Furthermore, foot traffic, trash, dog urine and other sources can also damage trees.

As a result of various urban hazards, urban trees have a shorter life expectancy than other trees. At the same time, trees and gardens are important to the environment. They increase aesthetics and property values, reduce aggression and noise, and provide other environmental benefits (e.g., enhanced air quality and temperature moderation). Because of the desirability of having trees and gardens and the known hazards to trees in the urban environment, it is known to put fences, brick walls, and other structures around trees, particularly in urban environments, to protect them from these hazards.

SUMMARY

However, many of these known structures actually harm trees in particular as their design can often girdle the tree, compact the soil or restricts water from flowing into the tree pits. Moreover, existing urban tree guards are typically custom made iron fences that are welded around a tree, which requires specialized skills and equipment. This makes it inconvenient and expensive to provide and repair tree guards and, as a result, many trees in urban environments lack proper protection. A modular tree guard assembly is needed that can be easily assembled, installed and repaired and is cost effective.

An embodiment of the present invention provides an L-shaped breakaway bracket for use with a modular tree guard assembly. One embodiment provides an L-shaped breakaway bracket which includes a vertical member and a horizontal member extending substantially perpendicularly from the vertical member. In one embodiment, the vertical member is thinner and longer than the horizontal member.

The horizontal member and the vertical member may each have one or more fastener holes. In one embodiment, the fastener holes may be adapted to receive tamper proof fasteners. In other embodiments, the fastener holes may be adapted to receive standard (e.g., non-tamper proof) fasteners. A top rail and a bottom rail may be coupled to a corner post, middle post and/or end post by coupling the vertical member to a corner post, middle post or end post, and coupling the horizontal member to a bottom surface of the top rail or the bottom rail using one or more fasteners.

In a preferred embodiment, the breakaway bracket advantageously breaks and thereby separates a rail from the corner post, middle post or end post when a force that would otherwise be sufficient to deform a top rail or a bottom rail is applied to one of the rails. One result of such an embodiment is that it allows for quick and inexpensive repair of the tree guard assembly. Tree guards are particularly needed in an urban environment. And, being exposed to frequent foot traffic and vehicular traffic (e.g., vehicles parking on the street), tree guards are at some risk of being vandalized or tampered with. Moreover, the modular tree guard assembly, without the use of the inventive breakaway brackets, would be potentially more expensive and time consuming to repair.

In one embodiment, the breakaway bracket may include a groove along the intersection of the horizontal member and the vertical member. The groove allows the breakaway bracket to have a tighter connection with a rail (e.g., top rail or bottom rail) when the breakaway bracket is coupled to the rail. The breakaway bracket is adapted such that if and when the breakaway bracket breaks, the horizontal member may separate from the vertical member along the groove. It should be noted that the groove is not required to allow the breakaway bracket to break along the intersection of the horizontal member and the vertical member. In other words, in embodiments where the breakaway bracket does not include the groove, the breakaway bracket will still break along the intersection of the horizontal member and the vertical member when a sufficient amount of force is applied to the breakaway bracket and/or the rails.

These and other embodiments are described with respect to the following drawings. However, the invention itself is not limited to these embodiments, but is defined only by the claims.

BRIEF DESCRIPTION OF THE DRAWINGS

For purposes of illustration only, several aspects of particular embodiments of the invention are described by reference to the following figures.

FIG. 2 further illustrates an extended nut for use with the illustrated top rail.

FIGS. 5a-5d illustrate various cross section views of the top rail of FIG. 2.

FIG. 8 illustrates the corner urine guard unit of the embodiment of FIG. 1 and also illustrates an additional urine guard side panel unit.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

Figure 1:
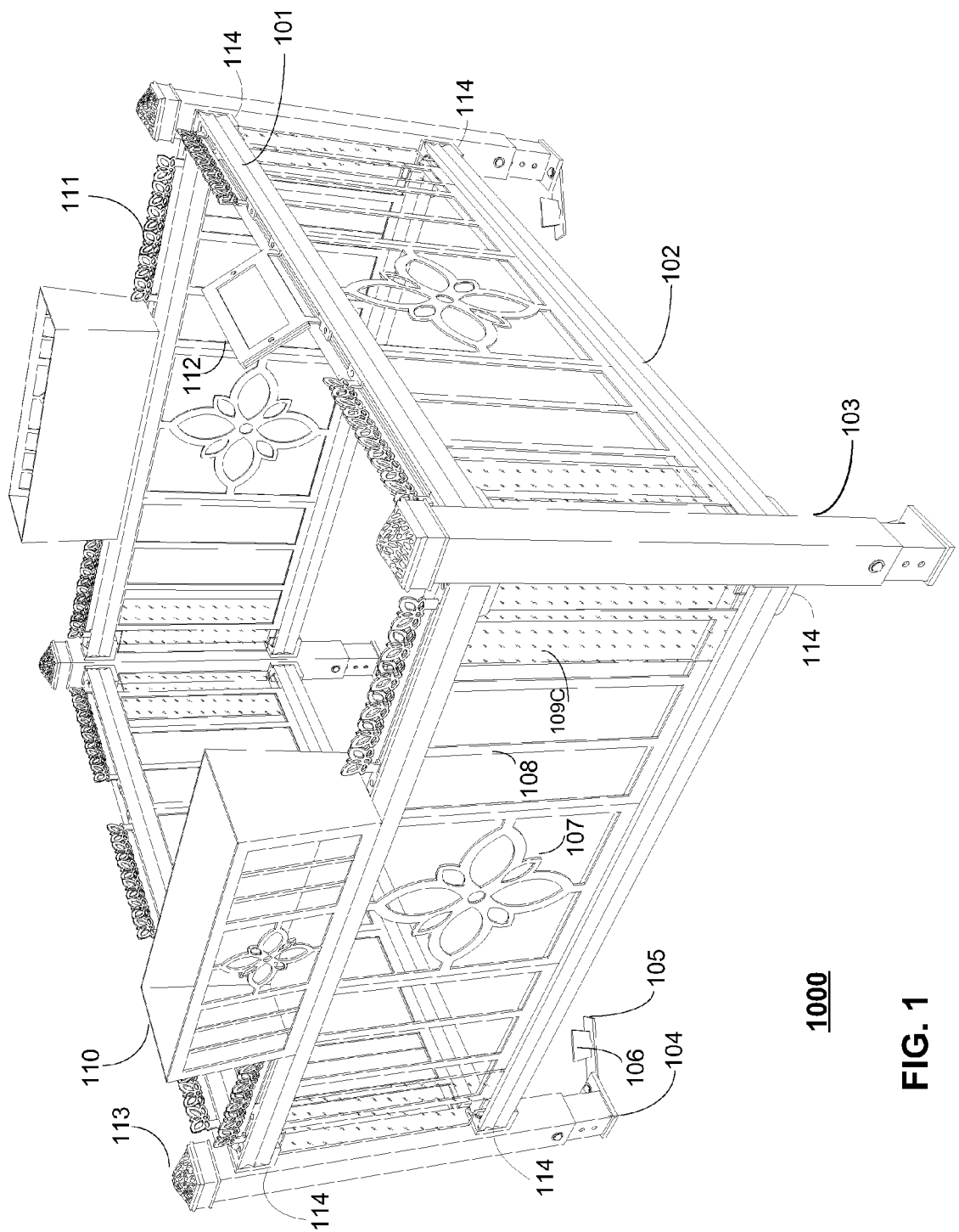
FIG. 1 illustrates a tree guard consistent with an embodiment of the present invention.

FIG. 1 illustrates a tree guard 1000 consistent with an embodiment of the present invention. Tree guard 1000 comprises a modular assembly including top rails 101, bottom rails 102, side panels 107 and 108, corner urine guard panels 109C, corner post units 103, post cap 113, adjustable feet 104, pivoting anchor plate 105, L-shaped breakaway brackets 114, and a variety of top rail accessories including planters 110, sit spikes units 111, and dedication sign 112. FIG. 1 further illustrates stake 106 for securing anchor plate 105 to a ground location in a tree pit. As used herein, the term "tree guard" will be used to refer to guards used for trees and to guards used for protecting small gardens that may include trees and/or other plants. Specifically, for ease of description, the term tree guard will be used to cover any such structure, whether that structure is to be used to protect trees or whether it is to be used to protect gardens with plants other than trees. Also, for ease of description, the term "tree pit" will be understood herein to include any soft ground area marked off from a surrounding or adjacent hard ground (e.g. concrete or other sidewalk) area whether that soft ground area is for trees or for other plants.

Various materials may be used for the illustrated components of tree guard 1000. However, in a preferred embodiment, rails 101 and 102 are made of higher elasticity materials than are side panels 107 and 108 and top rail accessories 110, 111, and 112. In one embodiment, rails 101 and 102 are made of 6005A-T5 aluminum and posts 103 are made of 6063-T6 aluminum.

Figure 2:
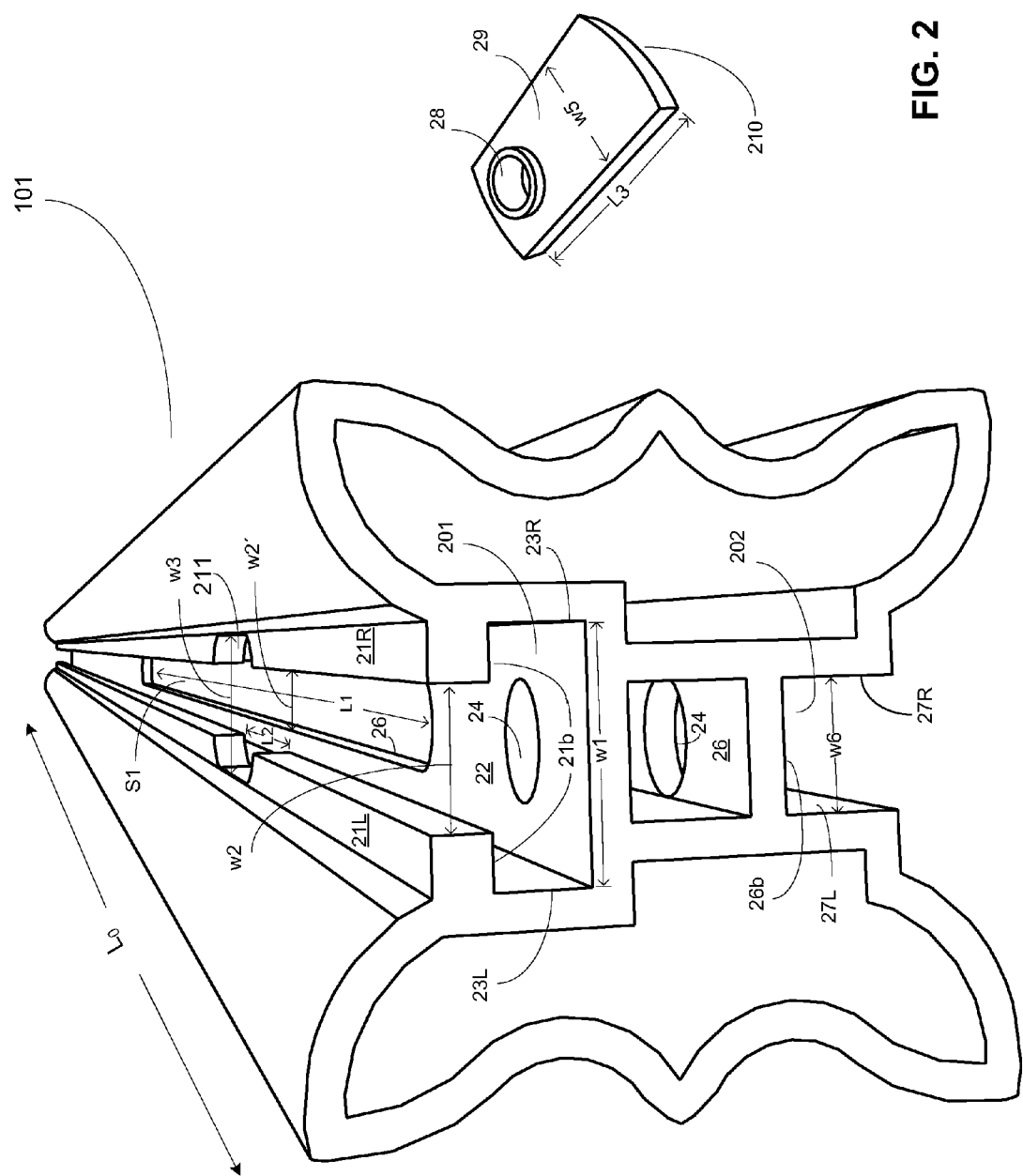
FIG. 2 illustrates further details of a perspective view of a portion of a top rail of the embodiment of FIG. 1.

FIG. 2 illustrates further details of a perspective view of a portion of a top rail 101 of the embodiment of FIG. 1 and further illustrates an extended nut 210 for use with top rail 101 to facilitate easy and flexible attachment of top rail accessories and/or to secure installed side panel inserts. Top rail 101 is consistent with an embodiment of the present invention.

Top rail 101 is formed to include a top groove 201 that runs along a length dimension $L_O$ of top rail 101 and has a width w1. Top rail 101 is further formed such that lips 21L and 21R overhang a portion of groove 201 such that top groove 201 is bounded by surface 22, left inner wall 23L, right inner wall 23R and the bottom sides 21b of lips 21L and 21R. Top rail 101 is further formed to include a bottom groove 202 that also runs along dimension $L_O$ and has a width w6. Bottom groove 202 is bounded by left wall 27L, right wall 27R, and bottom side 26b of surface 26. Top rail 101 is further formed to include a slot S1 through surface 22 and 26 to facilitate introduction of side panels as further described in the context of other figures herein. Slot S1 has a length L1 and a width w2'. In the illustrated example, width w2' is equal to width w2 between lips 21L and 21R. However, in alternative embodiments, widths w2 and w2' may be different. In a preferred embodiment, width w1 is equal or substantially equal to 0.531 inches; width w2 is equal or substantially equal to 0.281 inches; width w6 is equal or substantially equal to 0.281 inches; and length L1 is equal or substantially equal to 12.281 inches.

Extended nut 210 includes extended body 29 and threaded hole 28. Hole 28 is designed to receive a bolt or similar threaded male fastener member. In one embodiment, extended nut 210 is a commercially available weld nut such as part number 38144 available from Fastenal® Company (www.fastenal.com). Body 29 of extended number has a width w5 and a length L3.

In the illustrated example, a widened region 211 between lips 21L and 21R of top rail 101 is provided to facilitate easier introduction of extended nut 210 into groove 201. Region 211 has a length L2 and a width w3. In this example, width w3 is equal to width w1. However, in alternative embodiments, width w1 and w3 may be different. In this example, width w2 of the space between lips 21L and 21R is preferably less than width w5 of extended nut 210 and width w1 is at least slightly greater than width w5. Such an arrangement allows extended nut 210 to be easily positioned at a selected place along top groove 201 to help secure top rail accessories along top rail 101 as will be further described in the context of subsequent drawings. Moreover, length L2 of widened region 211 is preferably at least slightly longer than length L3 of extended nut 210. In a preferred embodiment, width w1 and w3 are equal or substantially equal to 0.531 inches; width w5 is equal or substantially equal to 0.500 inches; length L2 is equal or substantially equal to 1.156 inches; and length L3 is equal or substantially equal to 0.8125 inches.

While widened region 211 is present in a preferred embodiment to facilitate introduction of extended nut 210 in top groove 201, in alternative embodiments, a widened region such as region 211 may be smaller or absent. In such embodiments, a user may still introduce extended nut 210 into groove 201 by, for example, orienting nut 210 on its side relative to groove 201 (i.e., such that the plane of its main surface is perpendicular or otherwise non-parallel to surface 22) and then, after introducing nut 210 into groove 201, changing the orientation of extended nut 210 so that its main surface is parallel to surface 22, as will be appreciated by one skilled in the art.

Top rail 101 is further formed to include holes 24 through surfaces 22 and 26 for purposes of introducing a bolt to attach top rail 101 to an L-bracket that is in turn attached to a post unit 103 (post unit 103 and associated L-bracket shown in other figures but not separately shown in FIG. 2). For ease of illustration, holes 24 at one end of rail 101 are shown. Those skilled in the art will appreciate that such holes would also be present at another end of rail 101 to attach to an L-bracket of another post unit, but such other holes are not separately shown in FIG. 2.

Figure 3:
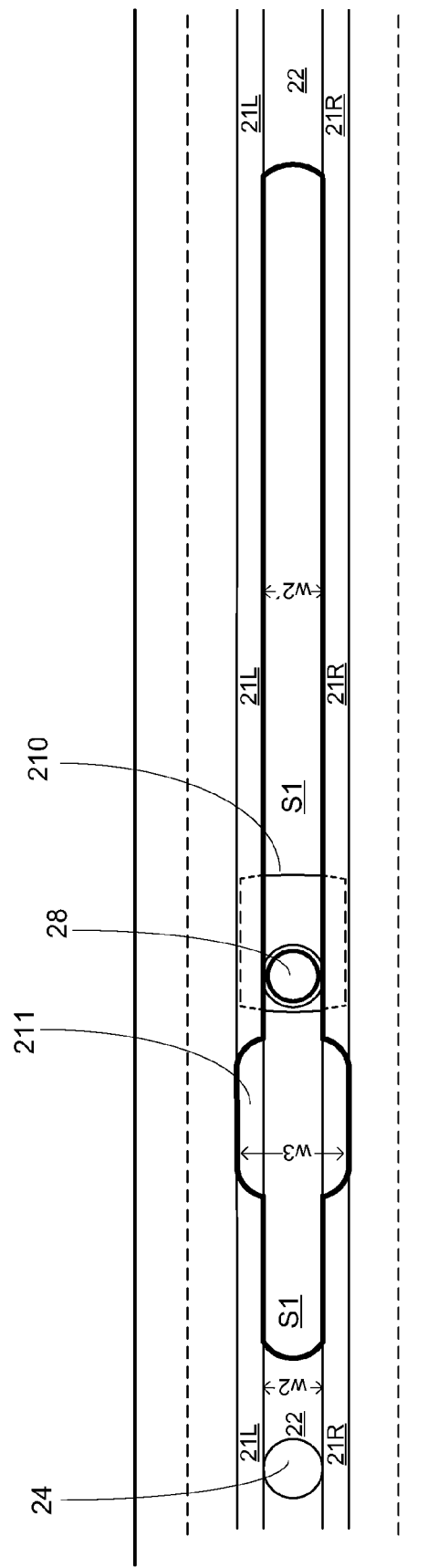
FIG. 3 is a top plan view of the top rail of FIG. 2 with the extended nut illustrated in FIG. 2 inserted into a top-side groove of the top rail.

FIG. 3 is a top plan view of top rail 101 with extended nut 210 inserted into groove 201 and positioned under lips 21L and 21R and above surface 22. Note that from this view, the part of surface 22 that is under lips 21L and 21R is hidden; also, slot S1 forms a gap in surface 22. As shown, width w2, which is the space between lips 21R and 21L, is preferably equal to or greater than a diameter of threaded hole 28 of extended nut 210. This allows a bolt (not separately shown) to be introduced and fastened into hole 28 through the gap between lips 21L and 21R. Such a bolt is used in conjunction with extended nut 210 to secure top rail accessories as will be shown and described in the context of other figures. Even if no top rail accessories are used, extended nut 210 can be secured with a bolt to "lock in" side panels that have been put in place through slot S1. Specifically, by blocking a portion of the gap between lips 21L and 21R above slot S1, a secured extended nut 210 can prevent easy removal of side panels through slot S1 after they have been installed as will be shown and described in the context of other figures.

Figure 4:
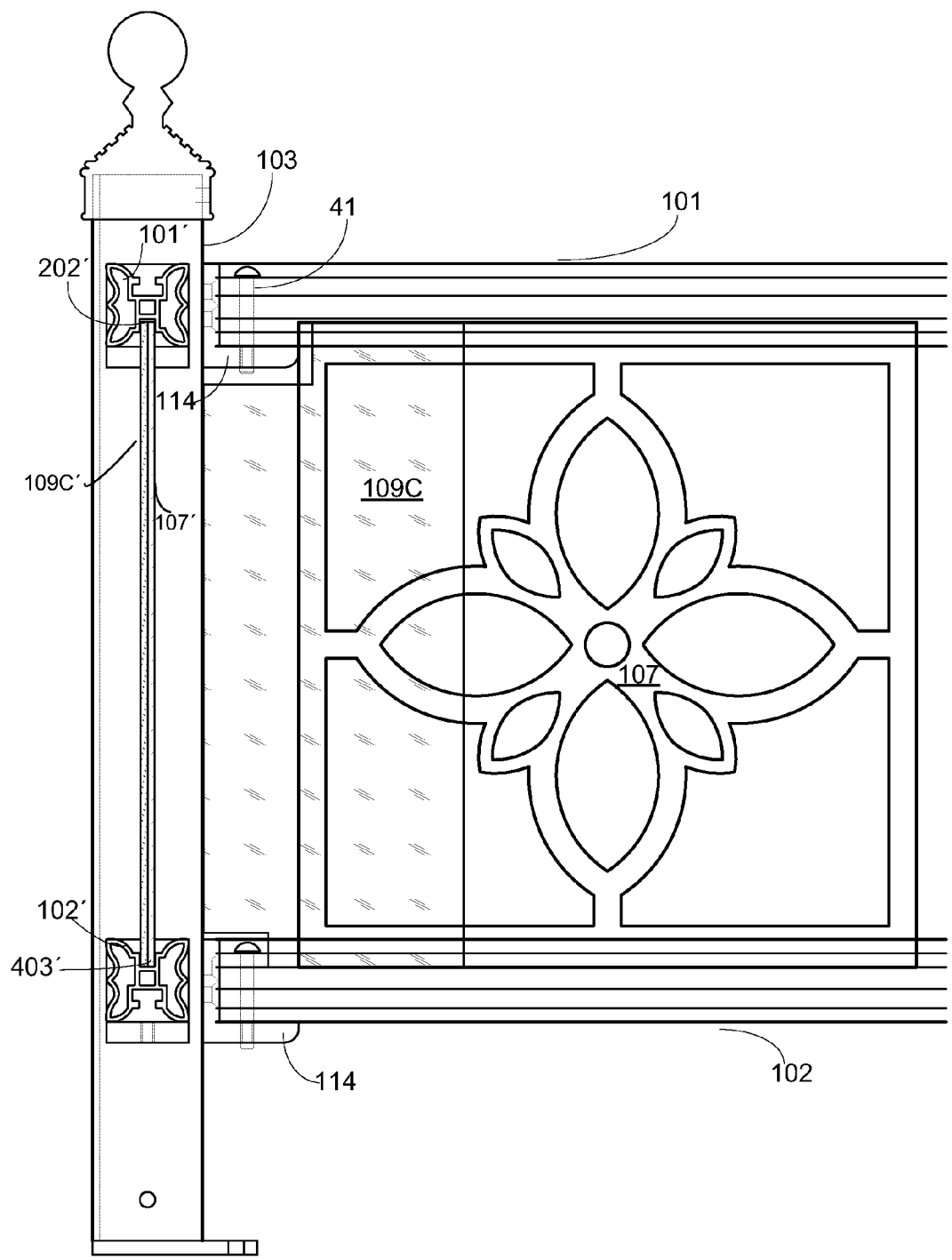
FIG. 4 illustrates further aspects of the embodiment of FIG. 1 including attachment of top and bottom rails to a corner post and overlapping placement of side panel and corner urine guard units in top and bottom rail grooves.

FIG. 4 illustrates further details of the post, rail, and side panel assembly of tree guard 1000 of FIG. 1. L-shaped breakaway brackets 114 are secured to, respectively, a top portion and a bottom portion of corner post 103 and L-shaped breakaway brackets 114 are also secured to, respectively, top rail 101 and bottom rail 102. Top rail 101 and an L-shaped breakaway bracket 114 are secured to each other using bolt 41 which is introduced through holes 24 in top rail 101 (holes 24 shown in FIGS. 2 and 3). A similar assembly is used to secure bottom rail 102 to post 103 as shown.

For purposes of explanation, FIG. 4 shows two corner urine guard units and two side panel units as well as two top rail units and two bottom rail units. A first top rail unit 101 and a first bottom rail unit 102 are shown with their long dimension parallel with the plane of the page. A second top rail unit 101' and a second bottom rail unit 102' are shown in cross section, oriented such that their long dimension is perpendicular to the plane of the page. A first side panel unit 107 and a first corner urine guard unit 109C are shown with their primary surfaces in (i.e. parallel with) the plane of the page. Second side panel unit 107' and second corner urine guard 109C' are shown with their primary surfaces perpendicular to the plan of the page. Side panel unit 107 and corner urine guard unit 109C are held in a bottom-side groove 202 of top rail 101 and a top-side groove (not separately shown) of bottom rail 102. Side panel unit 107' and corner urine guard unit 109C' are held in a bottom-side groove 202' of top rail 101' and a top-side groove 403' of bottom rail 102'. In the illustrated example, top side groove 202' in top rail 101' and bottom side groove 403' in bottom rail 102' (as well as comparable grooves in rails 101 and 102) have a width dimensioned to support overlapping placement of side panel unit 107' and corner urine guard 109C (and, with respect to grooves in rails 101 and 102, side panel until 107 and corner urine guard 109C). In the illustrated embodiment, urine guard units 109C and 109C' are shown in front of side panel unit 107. In alternative embodiments, urine guards 109 and/or 109C' may be behind or beside side panel unit 107. In one embodiment, this arrangement allows decorative aspects of a side panel unit to be visible in the region of a transparent corner urine guard unit. In other embodiments, similar grooves may be narrower such that a single side panel unit may be more securely held in the absence of an overlapping corner urine guard unit. In such alternatives, a corner urine guard unit and decorative side panel unit would be placed in a non-overlapping fashion within rail grooves. However, those skilled in the art will appreciate for embodiments in which a groove is dimensioned to contain up to two overlapping side panel units, it may be desirable, for better securing of a side panel unit, to provide spline for use when only one side panel is positioned in such a groove.

In some embodiments, it may be desirable to provide for side panels that are thicker than the side panels illustrated herein. Although in one embodiment described above that supported overlapping side panels within a groove, a groove thickness for bottom side groove 202 of top rail 101 is described to be equal or substantially equal to 0.281 inches, it may be describable in alternative embodiments to provide a slightly wider groove if thicker side panels are desired for reasons of durability and sturdiness. Note that in some embodiments, a top side groove of a bottom rail (such as top side groove 403' of bottom rail 102') and a bottom side groove 202 of a top rail 101 have widths that are substantially equal.

FIGS. 5a-5d show cross section views at various points along top rail 101 of FIG. 2. FIG. 5a shows a cross section through rail 101 at a point (along dimension $L_0$) prior to or beyond slot S1. FIG. 5b shows a cross section through rail 101 at a point along slot S1 but prior to or beyond widened region 211. FIG. 5c shows a cross section through rail 101 at a point along slot S1 within widened region 211. FIG. 5d shows a cross section through rail 101 at the center of hole 24. Also shown in this view is a bolt 41 securing top rail 101 onto an L-shaped breakaway bracket 114 which is secured to a post unit 103 (post unit 103 not separately shown) (only the horizontal member of L-shaped breakaway bracket 114 is shown because this is a cross section view).

Figure 6:
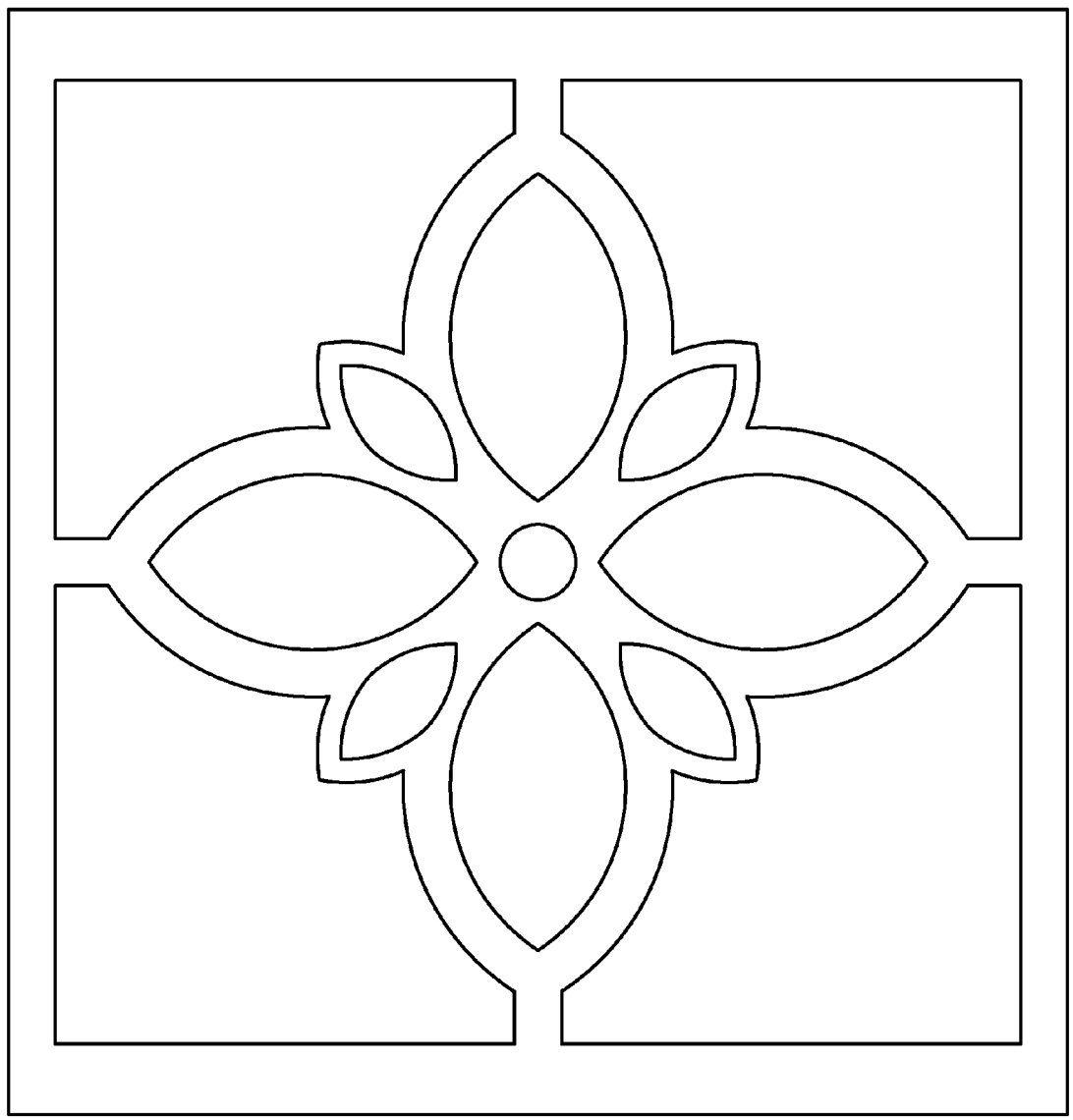
FIG. 6 illustrates a side panel unit of the embodiment of FIG. 1.

FIG. 6 illustrates a single side panel insert 107 of the tree guard assembly 1000 of FIG. 1.

Figure 7A:
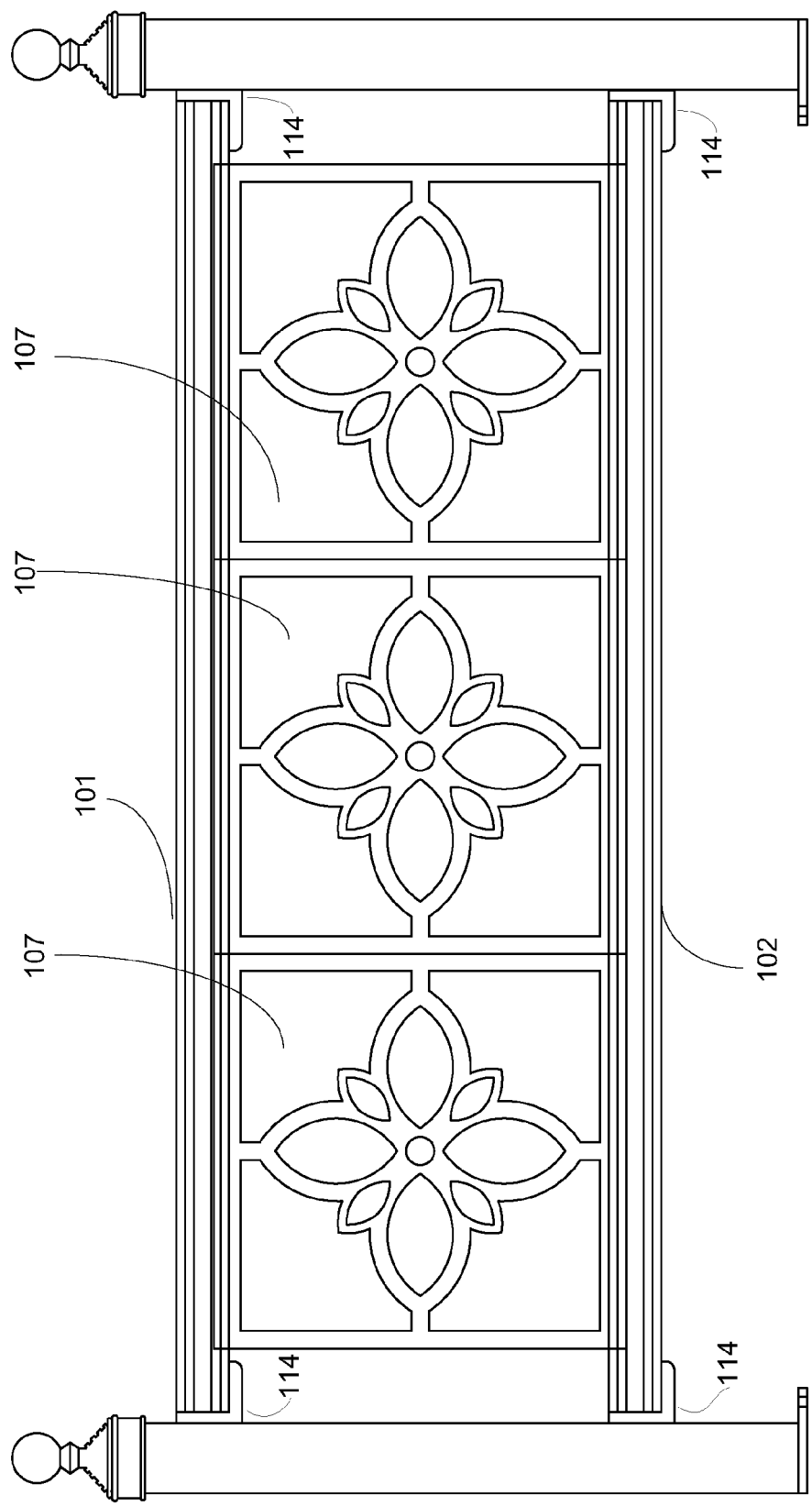
FIG. 7a illustrates a plurality of side panel units of the type shown in FIG. 6 installed adjacently in a tree guard consistent with one embodiment of the present invention.

FIG. 7a is a front plan view of a tree guard assembly with three side panel units 107 installed adjacently to each other. With reference to FIG. 2 and FIG. 3, each of the side panel units 107 shown in FIG. 7 may be installed in a tree guard unit 1000 that is already otherwise assembled by introducing them through (with reference to FIGS. 2-3) a slot S1 in top rail 101 and then sliding each along a top-side bottom rail groove (such as groove 403' in bottom rail 102' illustrated in FIG. 4) and bottom side top rail groove (such as groove 202' in top rail 101' illustrated in FIG. 4, or groove 202 illustrated in FIG. 2) until each side panel unit 107 is in the desired position. The panels may then be secured using extended weld nut 210 and a bolt to obstruct slot S1 as illustrated in FIG. 3. Also, although the view in FIG. 7a shows only side panels 107, the embodiment of FIG. 1 illustrates that panels with different decorative design types may be used together. As shown in FIG. 1, a first decorative design is formed in panels 107 and a second decorative design is formed in panels 108.

Figure 7B:
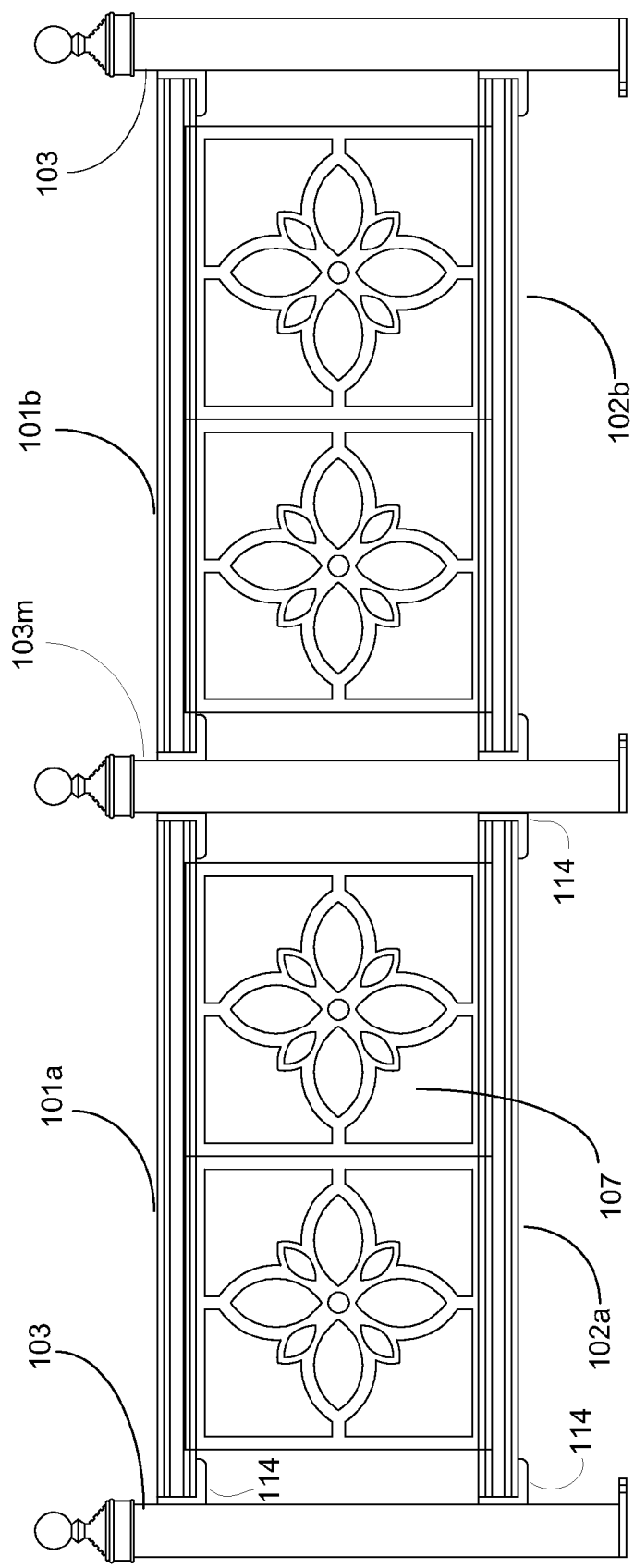
FIG. 7b illustrates an alternative embodiment consistent with aspects of the present invention in which a middle post is coupled between two top rails and two bottom rails.

FIG. 7b illustrates an alternative embodiment consistent with aspects of the present invention in which a middle post is included between two top rails and two bottom rails. Specifically, as shown in FIG. 7b, a middle post 103m is coupled between top rails 101a and 101b and between bottom rails 102a and 102b using L-shaped breakaway brackets 114. The illustrated top and bottom rails are also coupled to corner posts 103 using L-shaped breakaway brackets 114 as shown. In this embodiment, each corner post 103 is adapted to couple rails at 90 degree angles (as illustrated in FIG. 1) and a middle post 103m is adapted to couple rails (e.g., top rail 101a and 101b) at 180 degree angles (as illustrated in FIG. 7b).

In one embodiment, a variety of rail lengths are provided for flexibility in assembling a tree guard with appropriate side lengths. In one embodiment, side lengths longer than about 5 feet (5') are preferably accommodated by joining two or more rails with one or more middle posts along a side of a tree guard assembly. In one embodiment, the following length rails are optionally provided for user selection: 19⅜ inches (19⅜") (this length plus two corner posts makes the total side length 2.0 feet long); 25⅜"(this length plus two corner posts makes the total side length 2.5 feet long); 31⅜"(this length plus two corner posts makes the total side length 3.0 feet long); 37⅜" (this length plus two corner posts makes the total side length 3.5 feet long); 43⅜"(this length plus two corner posts makes the total side length 4.0 feet long); 49⅜"(this length plus two corner posts makes the total side length 4.5 feet long); and 55⅜"(this length plus two corner posts makes the total side length 5.0 feet long). A user may select one or more of the above rail lengths and use the corresponding rails in conjunction with corner post units only or may use one or more middle posts on a side in conjunction with a plurality of top rails and bottom rails on a side of a modular tree guard assembly. In an alternative embodiment, additional rails may be selected from including those of length: 61 ³⁄₈" (this length plus two corner posts makes the total side length 5.5 feet long); 67 ³⁄₈" (this length plus two corner posts makes the total side length 6 feet long); 73 ³⁄₈" (this length plus two corner posts makes the total side length 6.5 feet long); 79³⁄₈" (this length plus two corner posts makes the total side length 7 feet long); 85 ³⁄₈" (this length plus two corner posts makes the total side length 7.5 feet long); and 91 ³⁄₈" (this length plus two corner posts makes the total side length 8 feet long).

FIG. 8 illustrates corner urine guard unit 109C which may be installed to protect against urine near corners of tree guard 1000 as illustrated in FIG. 1 and FIG. 4. FIG. 8 further illustrates a urine guard unit 109A which may, if desired, be installed elsewhere along a side of tree guard 1000. For example, a urine guard unit such at 109A may be installed overlapping with, adjacent to, or in place of a side panel unit 107 illustrated in, for example, FIG. 7a. Corner urine guard unit 109C and urine guard unit 109A may be installed and positioned in a manner similar to that described above in the context of side panel units 107 of FIG. 7. Urine guard unit 109A and corner urine guard unit 109C are preferably made of a durable transparent and urine resistant material such as the polycarbonate material of PALGARD™, available from Palram Industries Ltd (see www.palram.com).

Figure 9:
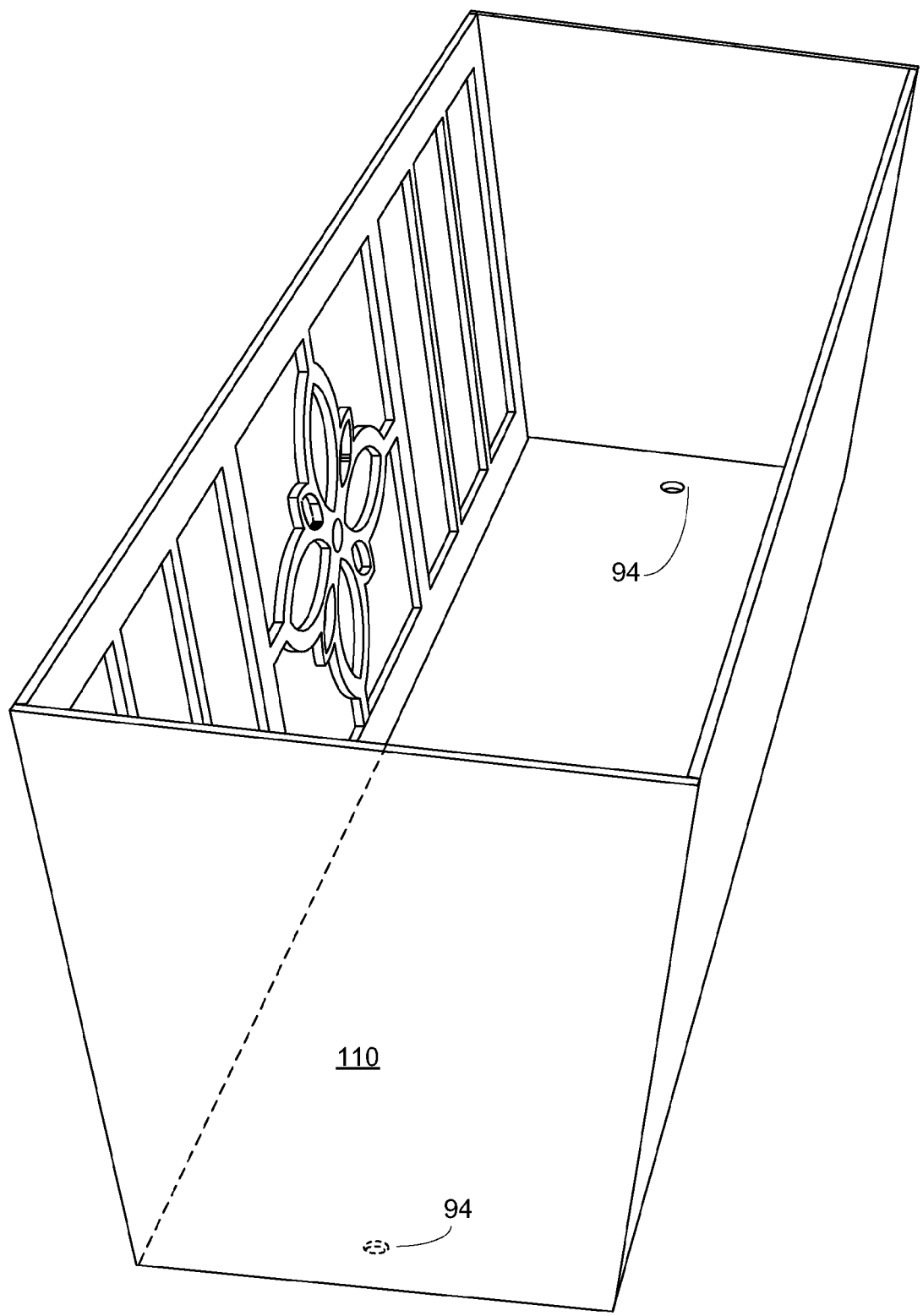
FIG. 9 illustrates a first top rail accessory (planter box) of the embodiment of FIG. 1.

FIG. 9 illustrates planter box 110 of the embodiment of FIG. 1. Planter box 110 includes holes 94 to facilitate installation as a top rail accessory as further described above and in the context of FIG. 10 below.

Figure 10:
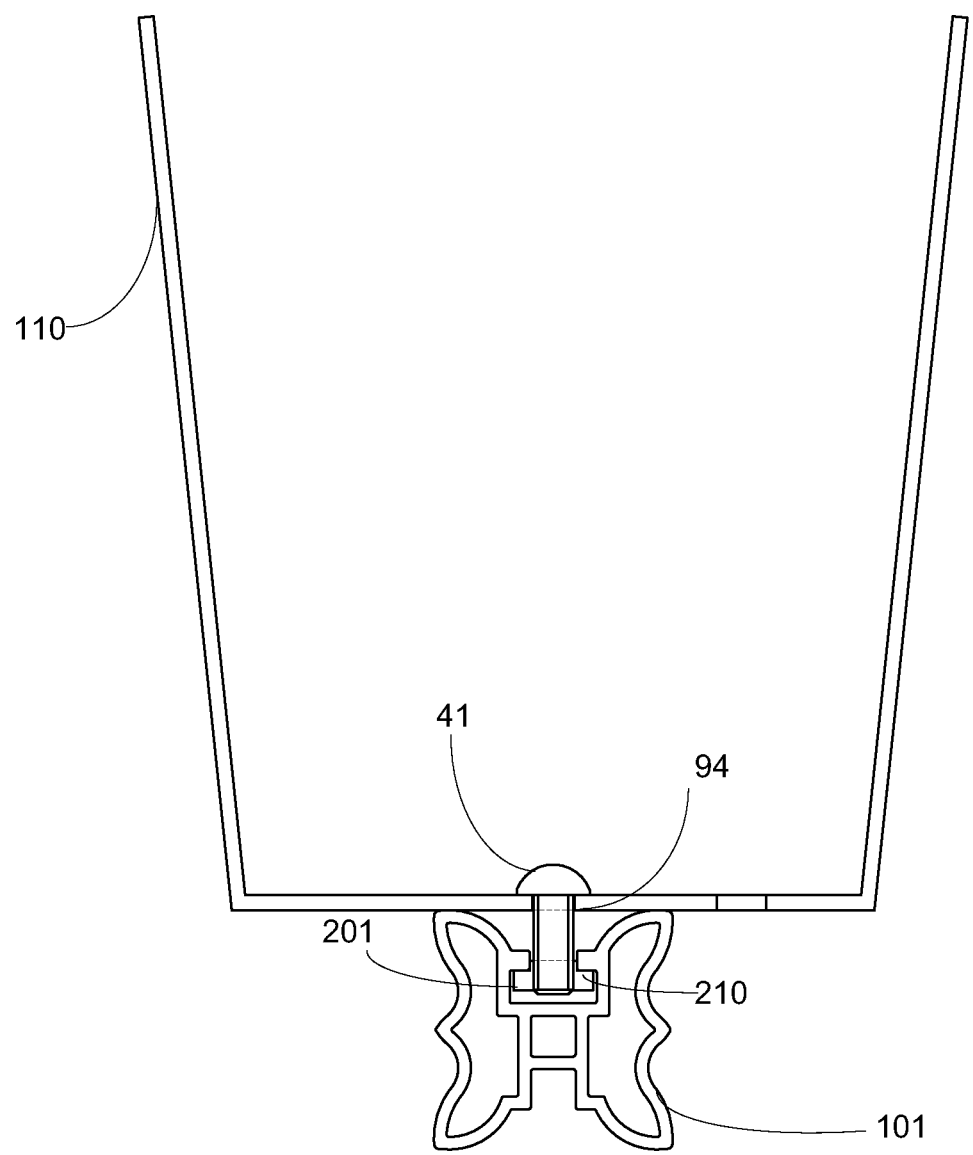
FIG. 10 illustrates the accessory of FIG. 9 installed on a top rail of the embodiment of FIG. 1.

FIG. 10 illustrates installation of top rail accessory 110 in further detail. Specifically, planter box 110 is secured above top rail 101 by fastening bolt 41 through hole 94 and into extended nut 210 which has been positioned within top-side groove 201 (beneath lips 21L and 21R, see FIGS. 2-3) at a desired location along top rail 101.

Figure 11:
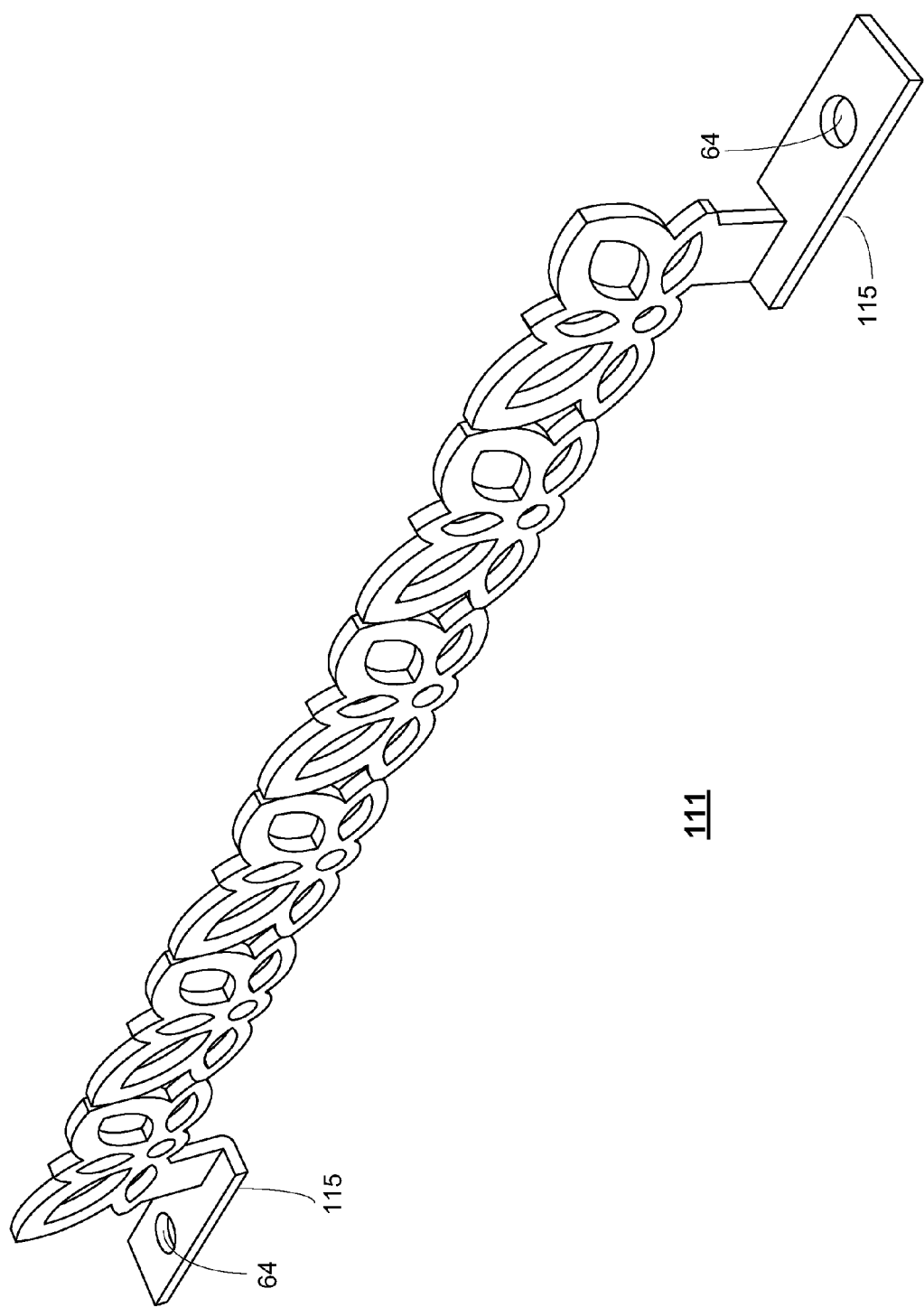
FIG. 11 illustrates a second top rail accessory (sit spikes unit) of the embodiment of FIG. 1.

FIG. 11 illustrates a different top rail accessory, sit spikes unit 111 of the embodiment of FIG. 1. Sit spikes unit 111 includes base portions 115 which in turn include holes 64 to facilitate installation as a top rail accessory on top rail 101 in a manner similar to that described for top rail accessory 112 in the context of FIG. 13 below.

Figure 12:
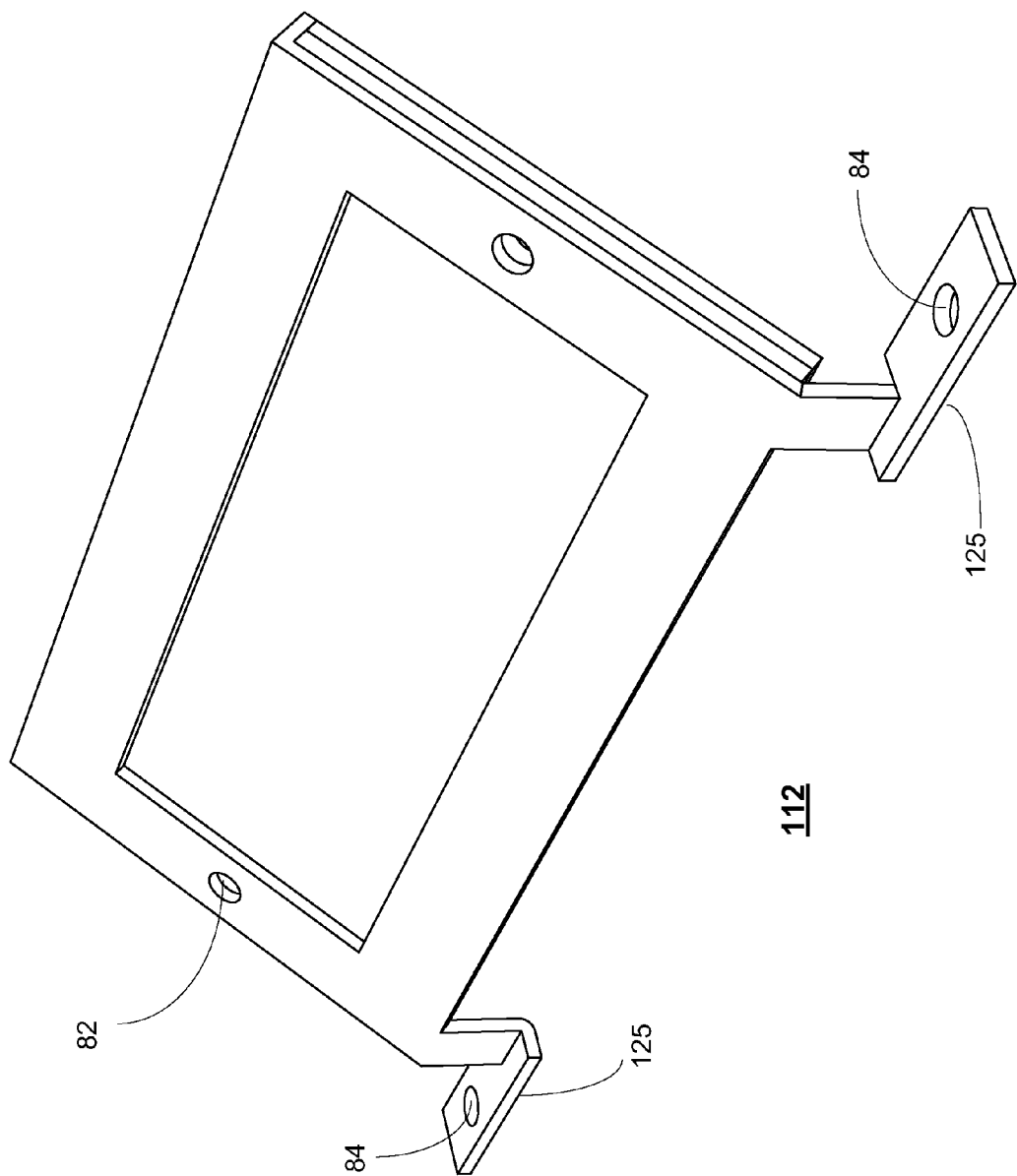
FIG. 12 illustrates a third top rail accessory (sign holder unit) of the embodiment of FIG. 1.

FIG. 12 illustrates another top rail accessory, sign holder 112 of the embodiment of FIG. 1. Sign holder 112 includes base portions 125 that in turn include holes 84 to facilitate installation as a top rail accessory on top rail 101 in a manner similar to that described for top rail accessory 110 in the context of FIG. 10. Sign holder 112 also includes holes 82 that may be used to receive a fastener bolt for secure a dedication or sponsorship sign in sign holder 112.

Figure 13:
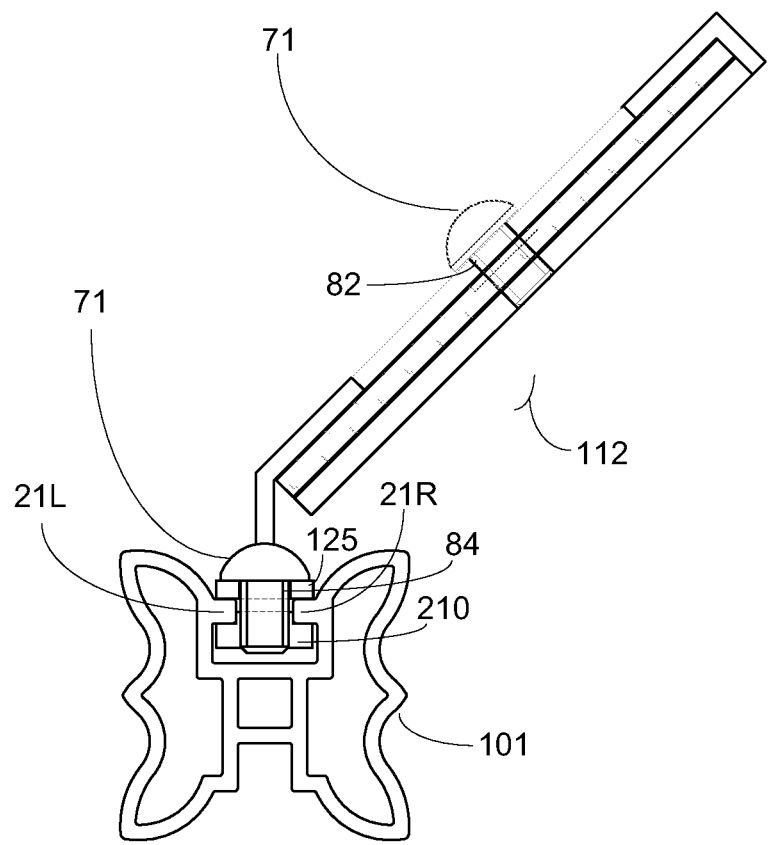
FIG. 13 illustrates the accessory of FIG. 12 installed on a top rail of the embodiment of FIG. 1.

FIG. 13 illustrates installation of sign holder 112 in further detail. Specifically, sign holder 112 is secured to top rail 101 by fastening bolt 71 through a hole 84 and into extended nut 210 which has been positioned within top-side groove 201 (beneath lips 21L and 21R) at a desired location along top rail 101. Note that in the case of sign holder 112, the base 125 can be secured directly on top of lips 21L and 21R.

Figure 14:
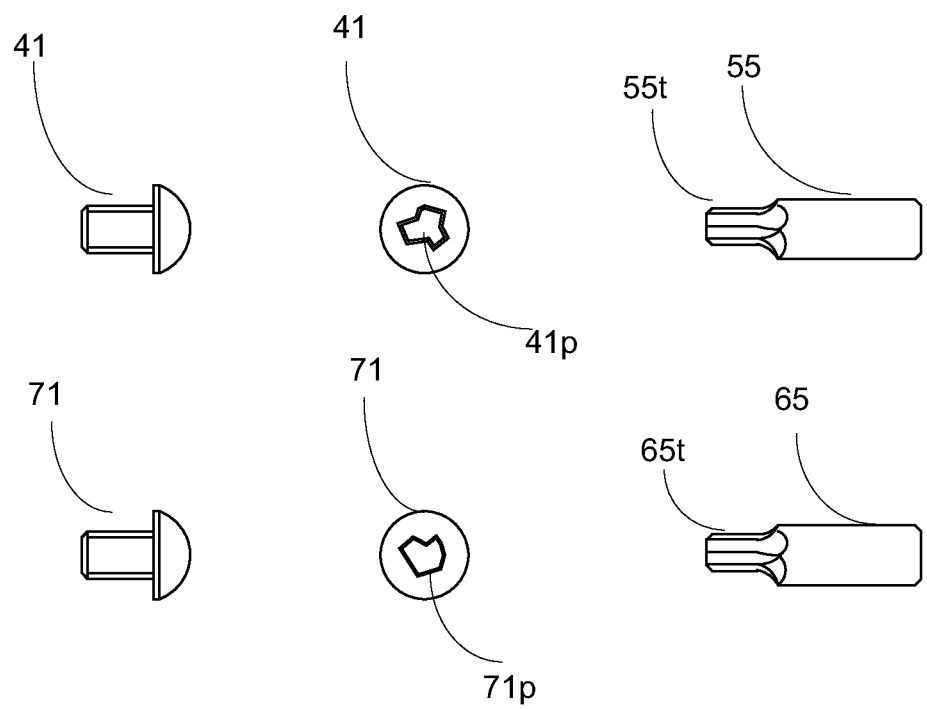
FIG. 14 illustrates different types of tamper-proof bolts that may be used in assembling and securing various aspects of the embodiment of FIG. 1.

FIG. 14 illustrates secure bolts 41 and 71 and corresponding locking bits 55 and 65 for use in conjunction with embodiments described herein. Bolt 41 has a first unique, non-standard screw head pattern 41p. Bolt 71 has a second unique, non-standard screw head pattern 71p. Bit 55 has a bit tip 55t that fits screw head pattern 41p of tamper proof bolt 41. Similarly, bit 65 has a bit tip 65t that fits screw head pattern 71p of tamper proof bolt 41. Thus, each tamper proof bolt and bit combination, with their corresponding unique screw head and bit tip patterns, act together as a lock and key so that bolts cannot be easily removed without the corresponding unique bit. Tamper proof bolts such as bolts 41 and 71 and corresponding bits such as bit 55 and 65 are, in one embodiment, commercially available.

In a first embodiment, tamper proof bolts with a first unique pattern, such as pattern 41p of bolt 41, are used to assemble various aspects of tree guard 1000 of FIG. 1. One result of such an embodiment is that it is difficult to dis-assemble and steal some or all of tree guard 1000. Tree guards are particularly needed in an urban environment. And, being exposed to frequent foot traffic, are at some risk of being stolen. Moreover, the inventive modular tree guard embodiment of FIG. 1 would, without the use of tamper proof bolts, would be potentially more vulnerable to theft than prior art tree guards formed by welding together iron pieces around a tree. However, such prior art tree guards lack the flexibility and modularity of inventive tree guard embodiment 1000 of FIG. 1.

In a second embodiment, a tamper proof bolt having a second unique pattern, such as pattern 71p of bolt 71, is used for attaching a dedication sign holder such as sign holder 112 of FIG. 12. In this second embodiment, the dedication sign holder is secured by tamper proof bolts having a unique screw head pattern that is different than the pattern of bolts used for assembling other parts of the tree guard. In one embodiment, such an arrangement addresses the challenge of motivating tree guard funding. For example, a city, non-profit, or other tree-promoting entity, may wish to encourage businesses or residential buildings to support tree guards and/or other costs associated with creating and maintaining tree pits in an urban area. In exchange for funding the tree guard (or other tree-related costs), a city or other entity may allow signage on the tree guard mentioning the tree guard sponsor. This may benefit a sponsor business by promoting goodwill toward that business and/or enhancing the business name recognition.

Individuals may also wish to sponsor tree-related expenses in exchange for name recognition. However, the practicality of such an arrangement may be enhanced by allowing a tree-promoting entity (such as a city, neighborhood association, authorized non-profit, etc.) to have exclusive control over the content of signage placed on the tree guard. Therefore, although a business or other entity proximate to the tree might agree to have responsibility to assemble and install the tree guard (and therefore need access to tamper proof bolts such as bolts 41 with a first pattern 41*p*), it might be beneficial to allow a third party controlling entity (such as a city) to have exclusive access to tamper proof bolts (and corresponding bits) with a second unique pattern (such as pattern 71*p* of bolts 71). In one embodiment, such unique bolts are given only to a third party tree promoting entity for use in securing a sign in sign holder 112 through sign securing holes 82. In another embodiment, such unique bolts are also provided for use in securing the sign holder itself to the tree guard through holes 84 (for example, as illustrated in FIG. 13). In one embodiment, holes 82 and/or holes 84 are dimensioned to reject bolts 41 while accepting bolts 71. In such an embodiment, bolts 41 and 71 would have different diameters than each other.

In another alternative embodiment, signage may be provided as part of a side panel unit. In such an embodiment, a unique bolt such as bolt 71 may be provided to a third party tree-promoting entity for use in securing a signage side panel unit in conjunction with an extended nut to obstruct a slot such as slot S1 as previously described. In this embodiment, other extended nuts may be used in conjunction with bolts 41 (provided to a tree guard user) to install top rail accessories on a portion of a top rail groove not obstructed by the extended nut secured by a bolt 71 (which, in this embodiment, would be used for obstructing a slot to prevent removal of a signage side panel).

Figure 15C:
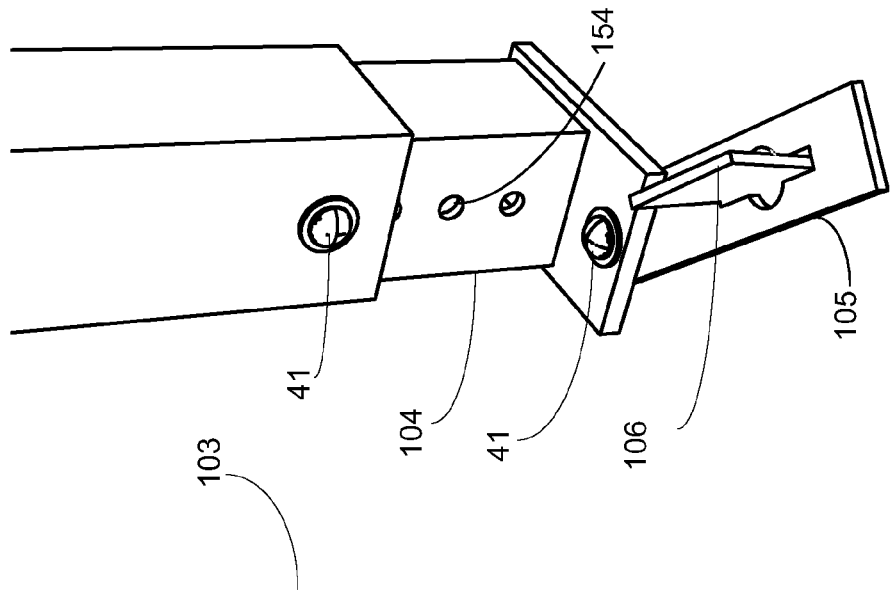
FIGS. 15a-15c illustrate the adjustable foot and pivoting anchor plate of the embodiment of FIG. 1.
Figure 15B:
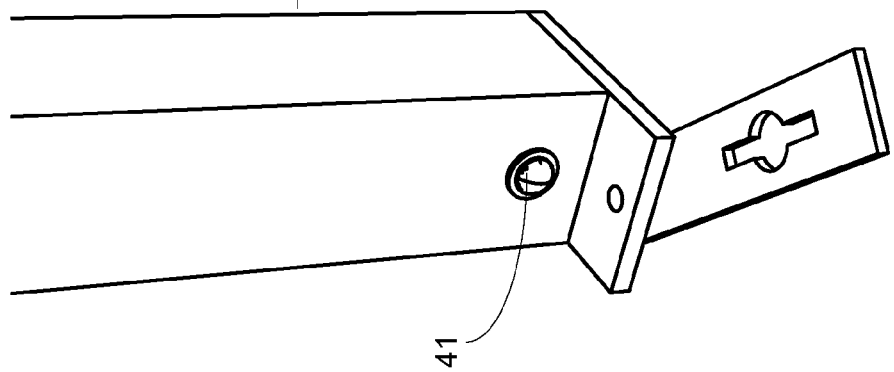
Figure 15A:
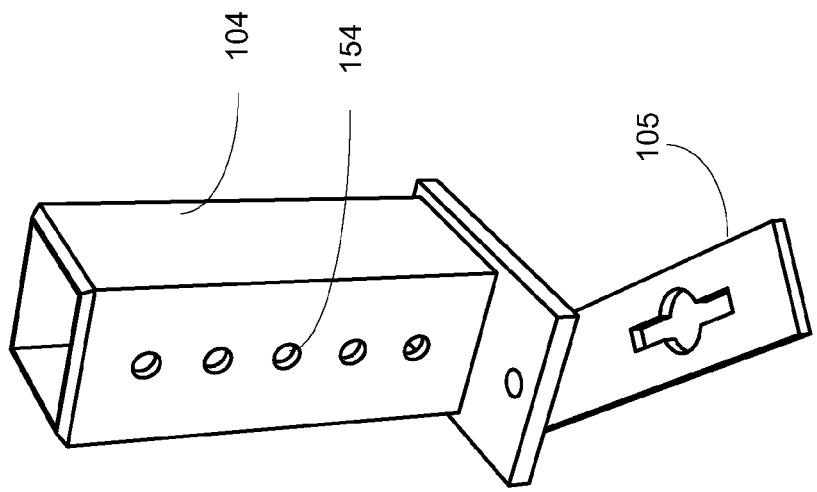

FIGS. 15*a*-15*c* illustrate adjustable foot 104 and pivoting anchor plate 105 of the embodiment of FIG. 1 in further detail. Tree pits, particularly in the urban environment, often have uneven surfaces due in part to the nature of tree roots being in a particularly confined environment. Moreover, tree roots and various urban ground obstructions within the pit and it can make it difficult to position a tree guard to find the best ground for inserting a stake to anchor the tree guard.

As shown in FIG. 15*a*, adjustable foot unit 104 includes holes 154. As shown in FIGS. 15*b*-15*c*, post unit 103 can slide to a selected position on foot unit 104 and then a bolt 41 can be used to secure post unit 103 to foot unit 104 at a desired height above a ground of a tree pit. In FIG. 15*b*, post unit 103 has been slid down foot unit 104 to a lowest position before being secured to foot unit 104 by fastening a bolt 41 through a lowest hole 154. In FIG. 15*c*, post unit 103 has been slid part of the way down foot unit 104 to an elevated position before being secured by fastening a bolt 41 through an elevated hole 154. This allows an effective length (height) of a first post 103 fastened to a first foot unit 104 to be greater than an effective length of a second post 103 fastened to a second foot unit 104 in an embodiment such as shown in FIG. 1, thereby compensating for unevenness in the ground of a tree pit and enabling the tree guard to appear level around its top rails.

As shown in FIG. 15*c*, anchor plate 105 is moveably attached to foot unit 104 by bolt 41 so that it can pivot relative to foot portion 104. This allows anchor plate 105 to be pivoted to find the best ground in which to insert a stake such as stake 106, which is inserted through anchor plate 105 to secure it to the ground and thereby secure foot unit 104 to the ground.

Figure 15D:
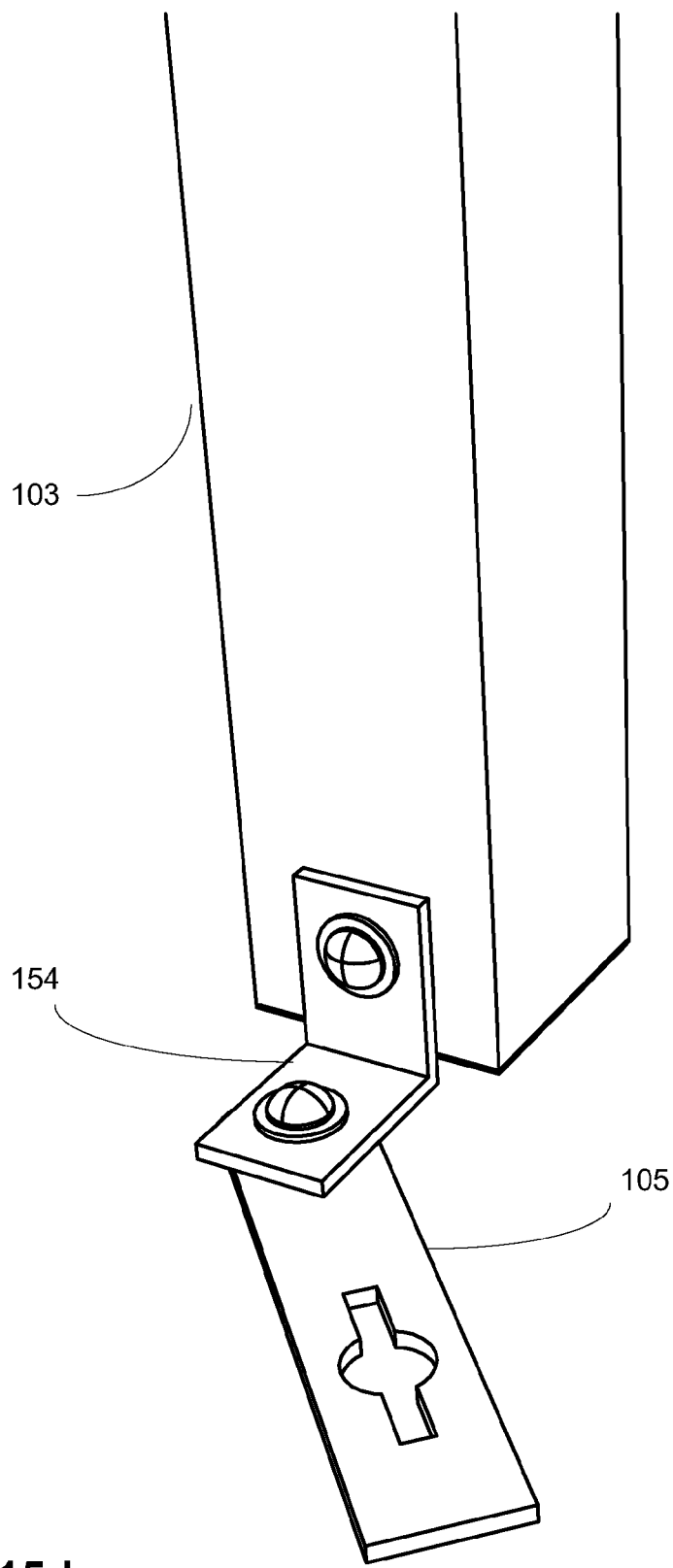
FIG. 15d illustrates an alternative embodiment in which the post and anchor plate of FIG. 1 and FIGS. 15a-15c are coupled via an L-bracket instead of via a foot unit.

FIG. 15*d* illustrates an alternative embodiment in which anchor plate 105 is coupled to post 103 via an L-bracket 154. In this embodiment, a separate foot unit may be provided but is not separately shown in FIG. 15*d*.

In the primary embodiments illustrated herein, a foot member and post member are separate units adapted to be coupled together. However, those skilled in the art will appreciate that the benefits of the illustrated anchor plate, which is movably coupled to a foot member in the embodiments illustrated in FIGS. 15*a*-15*c*, may be realized even if the foot member (to which the anchor plate is movably coupled) is integral with a corresponding post member. Therefore, in alternative embodiments, an anchor plate may be movably attached to a foot member that is integral with a post member without necessarily departing from certain aspects of an embodiment of the present invention. Moreover, in other embodiments, the anchor plate may be movably coupled to another element that is part of or integral with the post member such a flange member of the post. Such embodiment also will not necessarily depart from the spirit and scope of aspects of the present invention.

Figure 16:
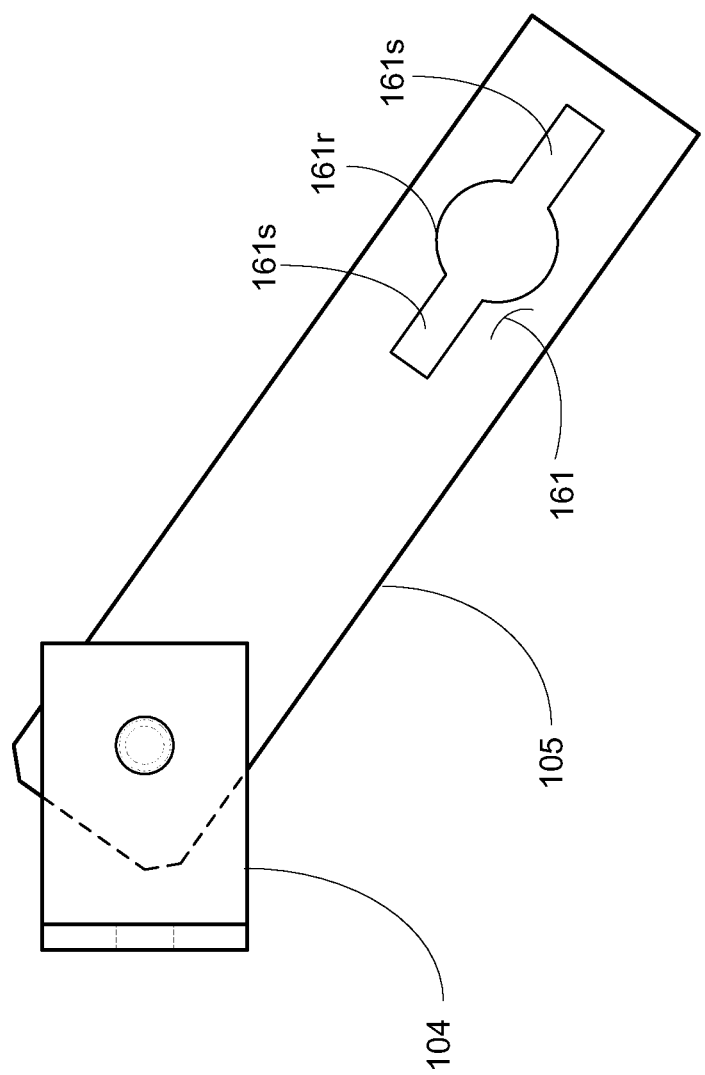
FIG. 16 is a top plan view of the anchor plate illustrated in FIG. 1 and FIGS. 15a-15d, in particular showing the stake opening of the anchor plate.

FIG. 16 illustrates further details of anchor plate 105. As shown in FIG. 16, anchor plate 105 in this embodiment is formed with an opening 161 for securing anchor plate 105 to the ground using a stake. Opening 161 is formed to accommodate a plurality of differently shaped stakes. In particular, opening 161 includes rectangular portions 161*s* and rounded portion 161*r* between rectangular portions 161*s*.

Figure 17A:
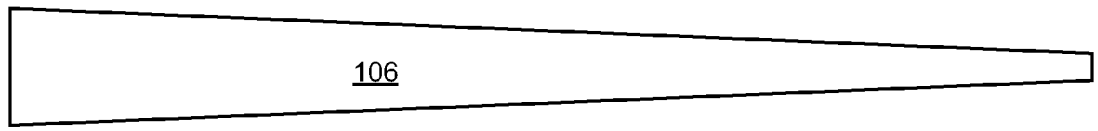
FIGS. 17a-17d illustrate different shaped stakes that may be utilized with the anchor plate illustrated in prior figures.
Figure 17B:
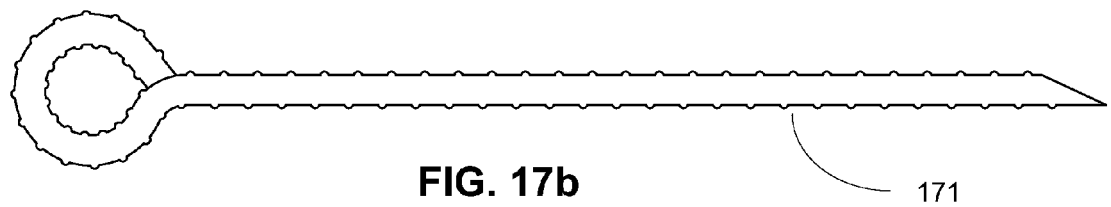
Figure 17C:
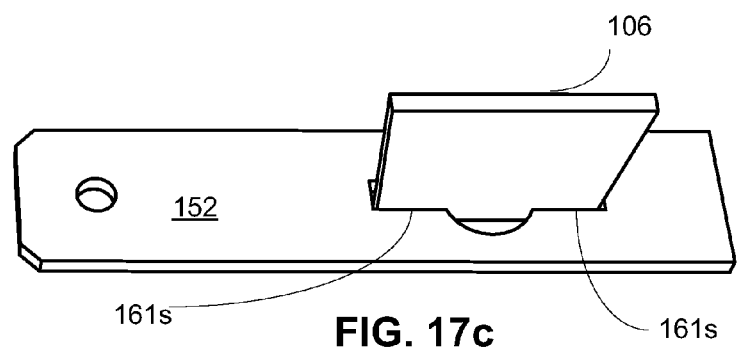
Figure 17D:
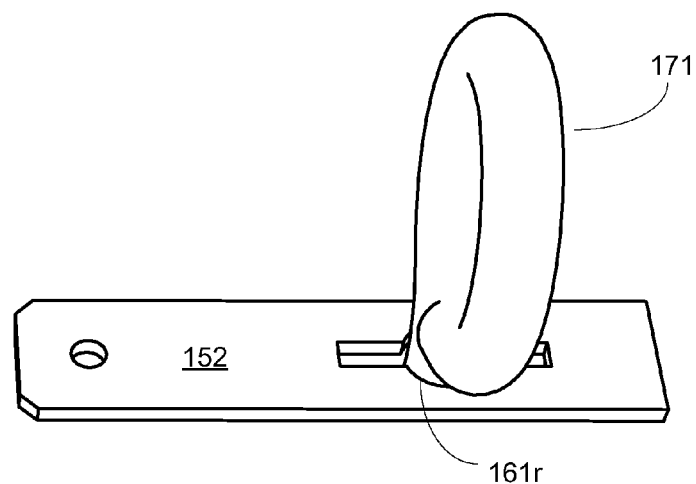

FIG. 17*a* illustrates tapered stake 106. FIG. 17*b* illustrates classic stake 171. As shown in FIG. 17*c*, tapered stake 106 may be utilized with anchor plate 105 by inserting stake 106 into opening 161 oriented to utilize the rectangular portions 161*s* of that opening. As shown in FIG. 17*d*, classic stake 171 may be utilized with anchor plate 105 by inserting stake 106 into opening 161 oriented to utilize the rounded portions 161*r* of that opening. In a preferred embodiment, a stake provided with the tree guard assembly has a length equal or substantially equal to 18 inches and a thickness equal or substantially equal to ½ an inch. In one embodiment, the stake is commercially available.

Figure 18:
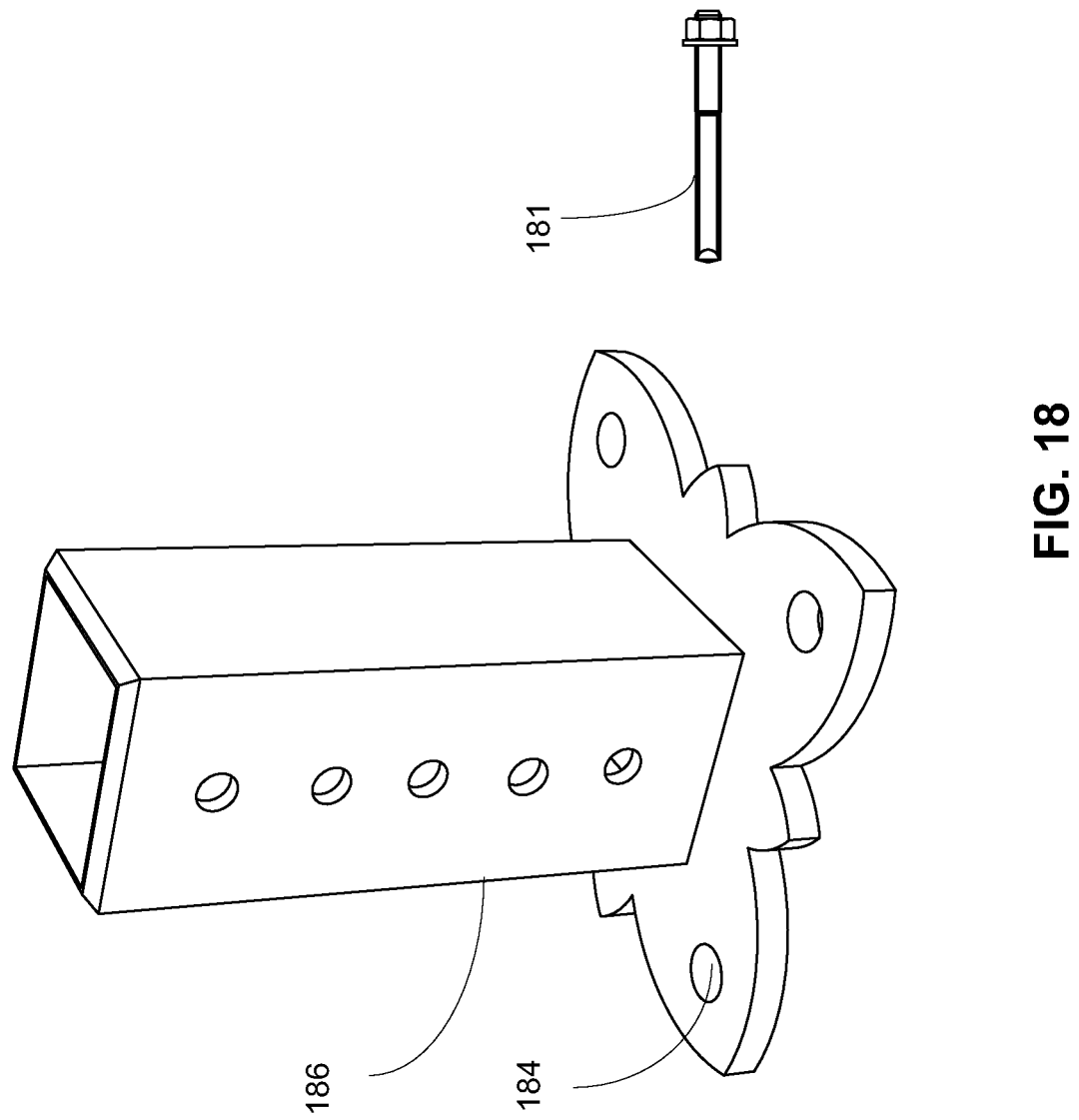
FIG. 18 illustrates an alternative embodiment adjustable foot that may be used when a tree guard consistent with an embodiment of the present invention is to be secured to a concrete surface such as a sidewalk.

FIG. 18 illustrates an alternative foot unit 186 for use when securing the foot to hard ground locations such a concrete or other pavement. This might be necessary when, for example, securing a foot to uncovered ground by use of stakes as illustrated in FIGS. 17*a*-17*d* is not practical. Foot unit 18 may be secured, for example, to a concrete sidewalk around a tree pit by use of a concrete screw such as screw 181 inserted through holes 184 of foot unit 186.

Figure 19:
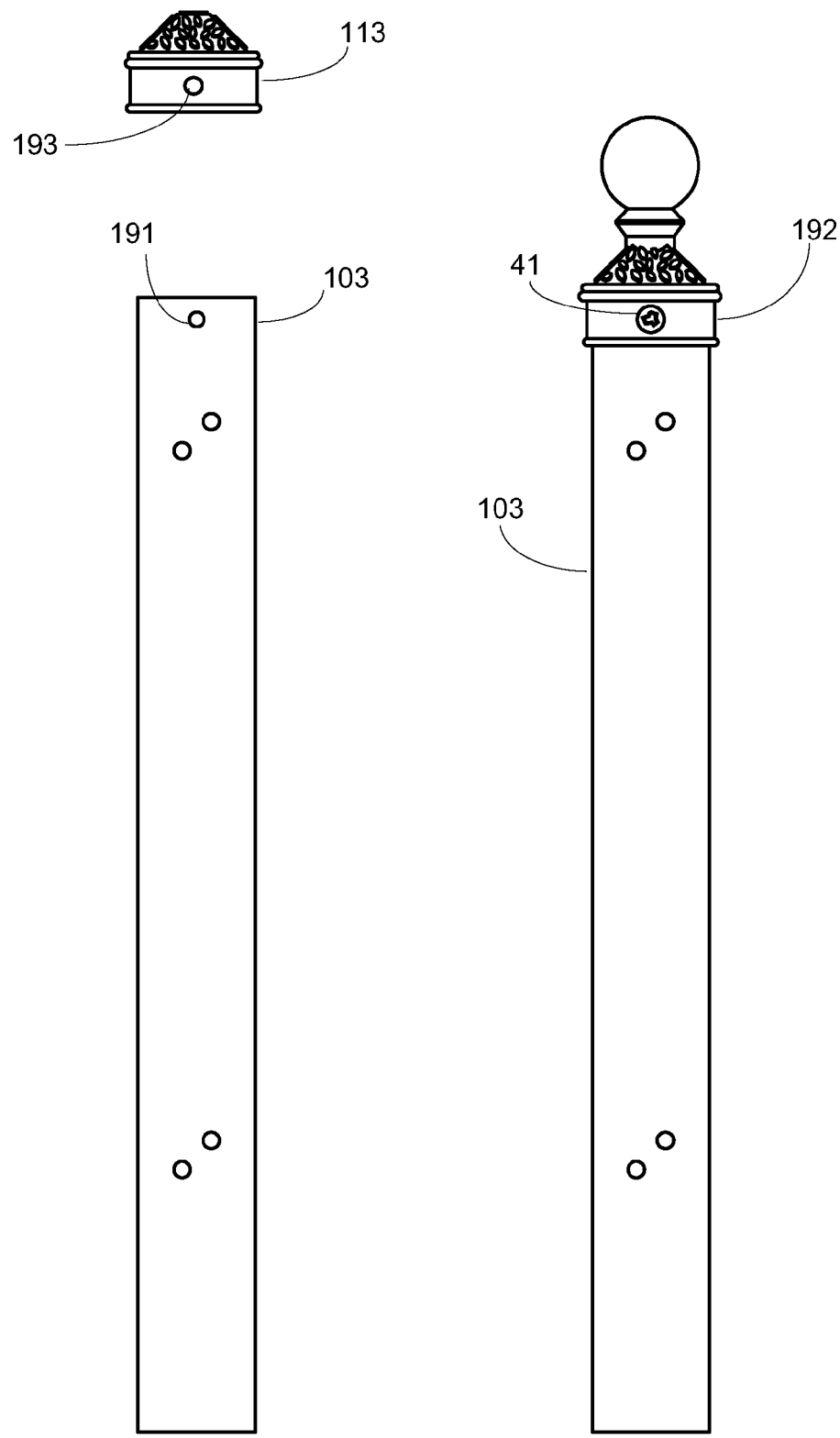
FIG. 19 illustrates a modular post cap of the embodiment of FIG. 1 and details related to removing the modular post cap and replacing it with an alternative post cap.

FIG. 19 illustrates the modularity of post cap 113 of the embodiment of FIG. 1. In particular, post cap 113 (which has a first finial design) can be removed from post unit 103 and replaced by post cap 192 (which has a second finial design). This is facilitated by hole 191 in post 103 and hole 193 in post cap 113. Either post cap 113 or post cap 192 may be secured to post 103 by inserted a bolt 41 through a hole 193 in the post cap and a hole 191 in the post.

Figure 20:
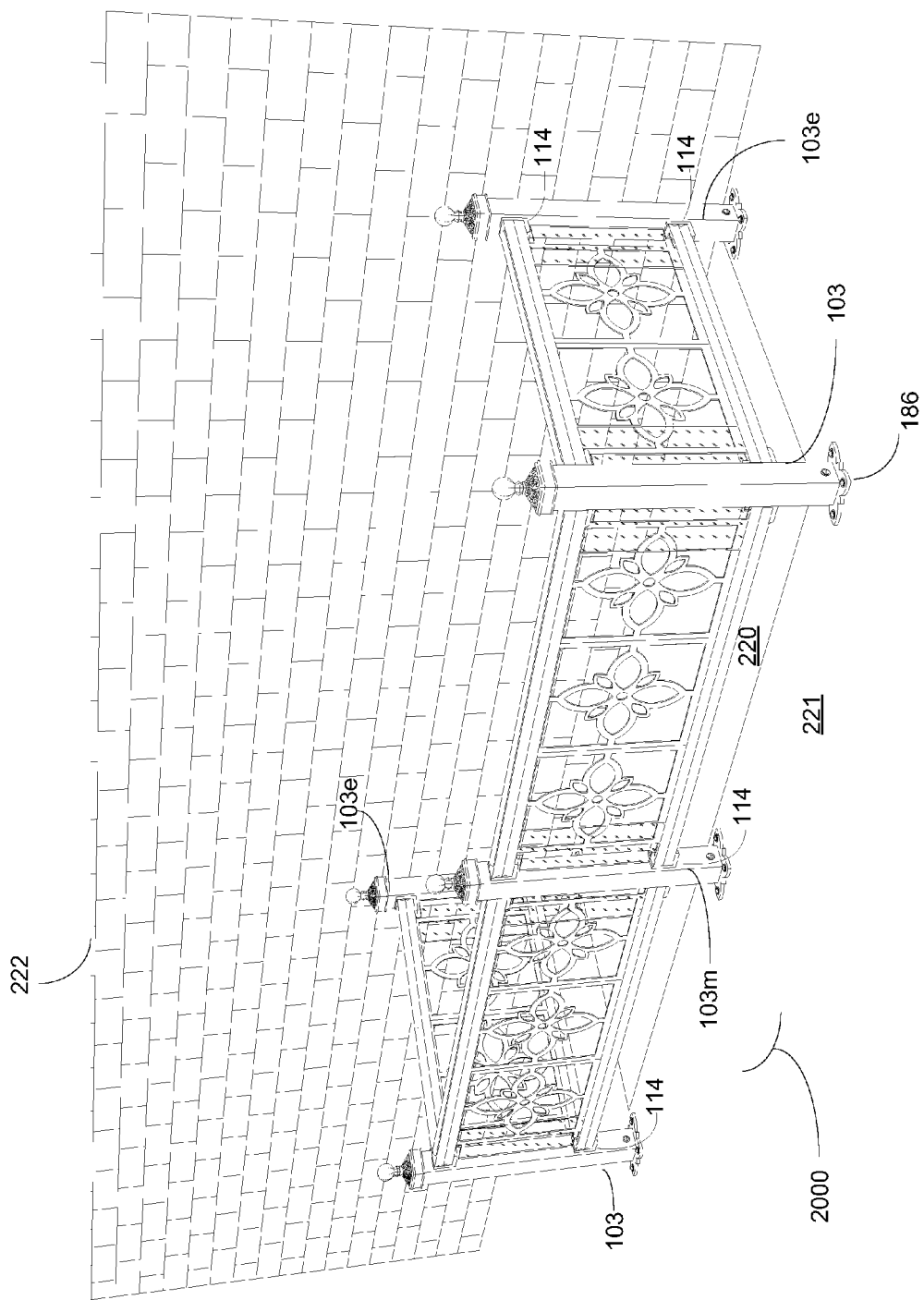
FIG. 20 illustrates a modular tree guard assembly consistent with an alternative embodiment adapted for installation near or against an outer wall of a building.

FIG. 20 illustrates an alternative embodiment in which a tree guard assembly consistent with an embodiment of the present invention is to be installed against or nearly again a wall (e.g., a wall of a building). Tree guard assembly 2000 includes corner posts 103 and middle post 103*m* as well as end posts 103*e*. This arrangement allows installation of tree guard assembly against wall 222. In this example, feet 186 are used to secure posts 103, 103*m*, and 103*e* to ground locations on hard ground 221 (e.g. a concrete side walk) and the tree guard is installed just outside of soft ground 220. Moreover, an end post 103*e* is adapted to couple to rails on just one side of the end post 103*e* using breakaway brackets 114 because wall 222 serves the function of a back side of the tree guard and thus rails need not be installed on multiple sides of each end post 103e.

Figure 21A:
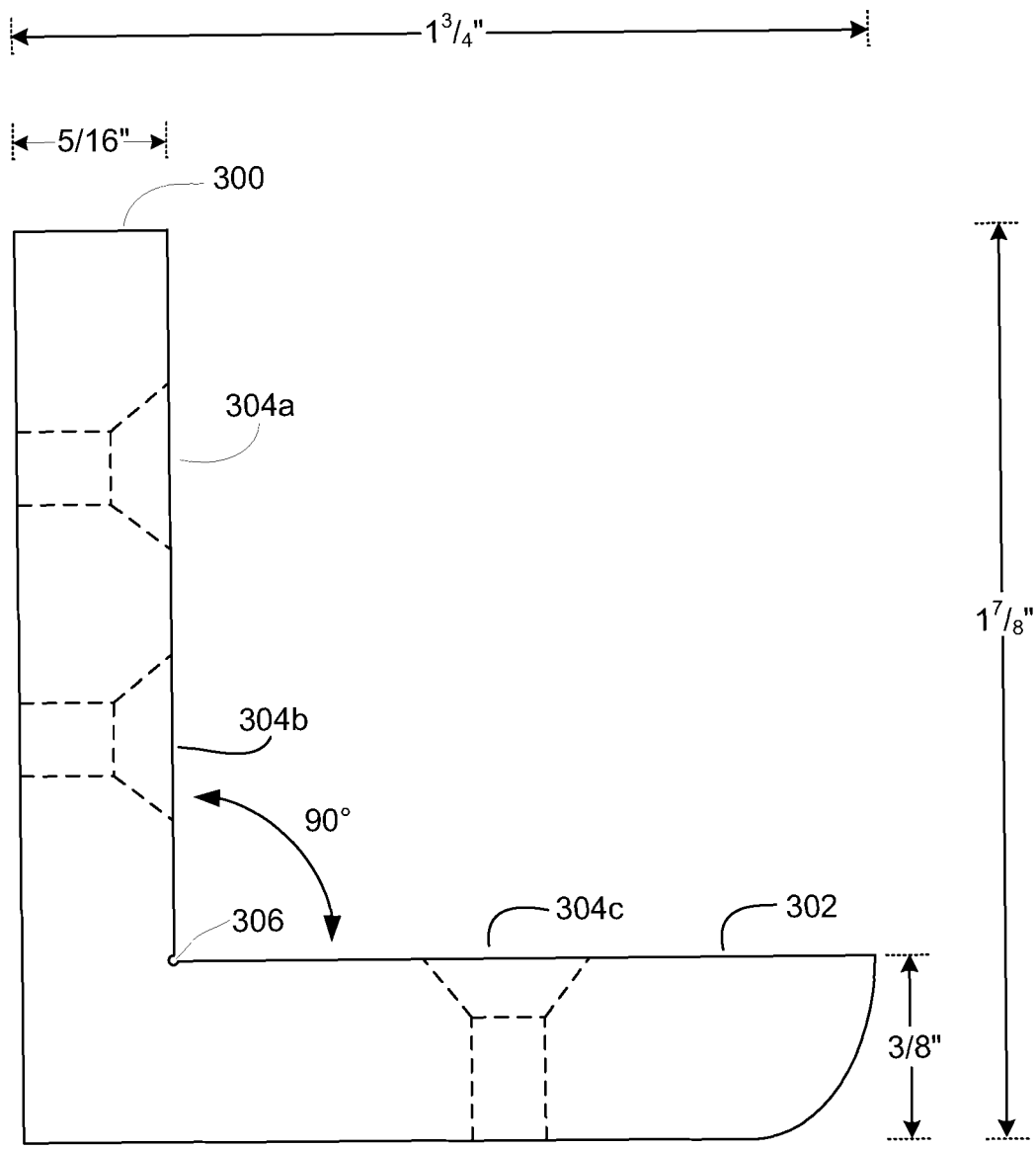
FIG. 21a is a perspective view of an L-shaped breakaway bracket of the embodiment of FIG. 1.
Figure 21B:
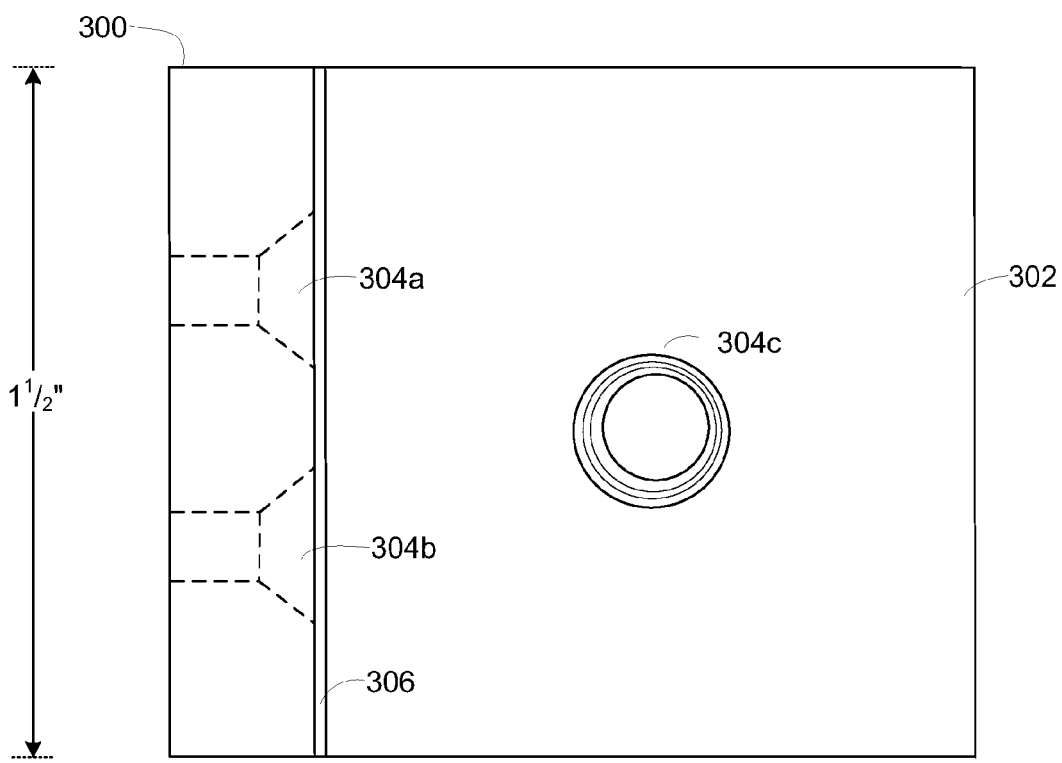
FIG. 21b is a top view of the L-shaped breakaway bracket of the embodiment of FIG. 1.
Figure 21C:
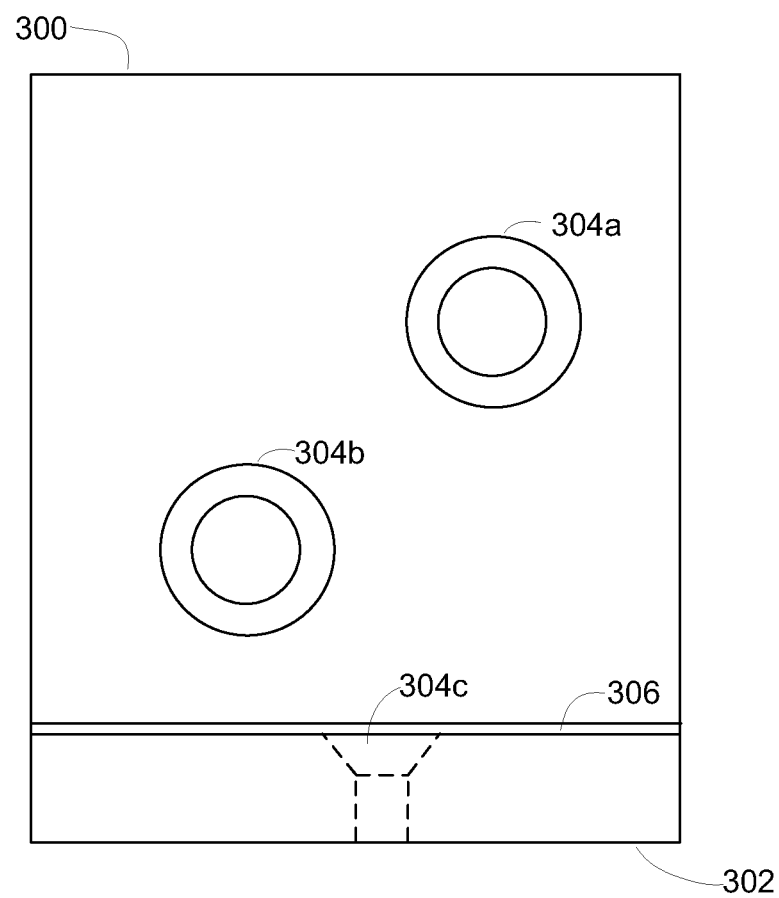
FIG. 21c is a front view of the L-shaped breakaway bracket of the embodiment of FIG. 1.

FIGS. 21a-21c illustrate L-shaped breakaway bracket 114 of the embodiment of FIG. 1 in further detail. Breakaway bracket 114 includes vertical member 300 and horizontal member 302 extending substantially perpendicularly from vertical member 300. In one embodiment, vertical member 300 is thinner and longer than horizontal member 302. In one embodiment, vertical member 300 has a thickness equal or substantially equal to 5/16 of an inch, and a length equal or substantially equal to 1 7/8 inches. In one embodiment, horizontal member 302 has a thickness equal or substantially equal to 3/8 of an inch, and a length equal or substantially equal to 1 7/16 inches. In one embodiment, breakaway bracket 114 has a width equal or substantially equal to 1.5 inches. The dimensions of breakaway bracket 114 may be varied and may be subject to manufacturing tolerances without necessarily departing from the spirit and scope of aspects of the present invention. It should be noted that in a preferred embodiment, the horizontal and vertical "members" are preferably formed from or as one continuous piece of metal. However, in alternative embodiments, the horizontal and vertical members may be formed from two pieces joined together (e.g., welded).

Horizontal member 302 and vertical member 300 may each have one or more fastener holes 304a-304c. Although two fastener holes in vertical member 300 and one fastener hole in horizontal member 302 are shown, vertical member 300 and horizontal member 302 may have any number of fastener holes arranged in varying orientations in other embodiments without necessarily departing from the spirit and scope of aspects of the present invention.

Fastener holes 304a-304c may be preferably adapted to receive tamper proof fasteners such as for example, tamper proof fasteners 41 and 71 as illustrated in FIG. 14. In other embodiments, fastener holes 304a-304c may be adapted to receive other types of tamper proof fasteners or standard (e.g., non-tamper proof) fasteners. Top rails 101 and bottom rails 102 may be coupled to corner posts 103, middle post 103m and end posts 103e by coupling vertical member 300 to corner posts 103, middle post 103m and end posts 103e, and coupling horizontal member 302 to a bottom surface of top rails 101 and bottom rails 102 using one or more fasteners as shown in FIGS. 1, 4, 5d, 7a, 7b and 20.

As illustrated in FIG. 21a, breakaway bracket 114 includes groove 306 along the intersection of horizontal member 302 and vertical member 300. Groove 306 allows bracket 114 to have a tighter connection with a rail (e.g., top rails 101 or bottom rails 102 of FIG. 1) when breakaway bracket 114 is coupled to the rails. Breakaway bracket 114 is adapted such that if and when breakaway bracket 114 breaks, horizontal member 302 may separate from vertical member 300 along groove 306 as shown in FIG. 22.

Figure 22:
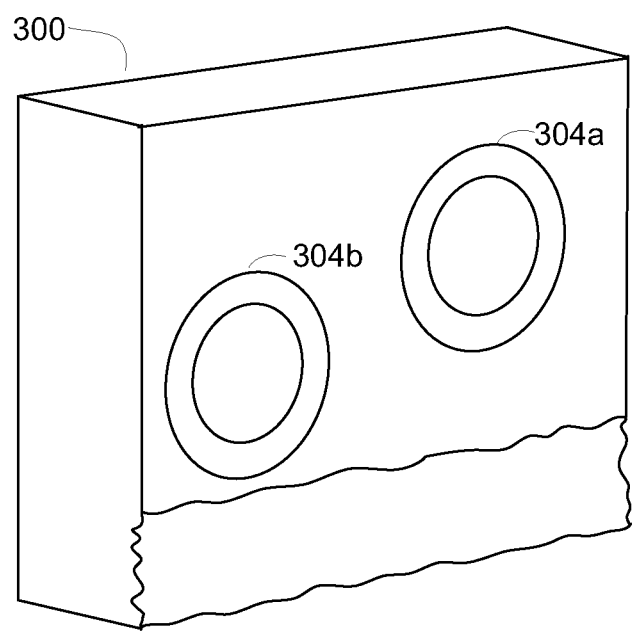
FIG. 22 illustrates an L-shaped breakaway bracket of the embodiment of FIG. 1 in which the horizontal member has sheared off.

FIG. 22 illustrates bracket 114 on which the horizontal member (not shown) has broken off. As shown in FIG. 22, the horizontal member separated from vertical member 300 along the intersection of the horizontal member and vertical member 300. It should be noted that groove 306 is not required to allow breakaway bracket 114 to break along the intersection of horizontal member 302 and vertical member 300. In other words, in embodiments where breakaway bracket 114 does not include groove 306, the breakaway bracket will still break along the intersection of horizontal member 302 and vertical member 300 when a sufficient amount of force is applied to the breakaway bracket and/or the rails.

In a preferred embodiment, breakaway brackets 114 advantageously break and separate top rails 101 or bottom rails 102 from corner posts 103 or middle posts 103m when a force amount that would otherwise be sufficient to deform (i.e., bend past the yield point such that an object's original shape is not recovered when the force is removed) top rails 101 or bottom rails 102 is applied to the rails and/or breakaway brackets 114. One result of such an embodiment is that it allows for quick and inexpensive repair of tree guard 1000. Tree guards are particularly needed in an urban environment. And, being exposed to frequent foot traffic and vehicular traffic (e.g., vehicles parking on the street), are at some risk of being vandalized or tampered with. Moreover, the modular tree guard embodiment of FIG. 1, without the use of the inventive breakaway brackets 114, would be potentially more expensive and time consuming to repair. For example, if top rail 101 or bottom rail 102 is struck by a car parking on the street, breakaway bracket 114 would break and separate top rail 101 or bottom rail 102 from corner post 103 or middle post 103m, thus preventing damage to the rail by preventing the force from the impact from being fully applied to the rail. A subsequent repair of the tree guard assembly would only require replacing one or more breakaway brackets 114, thus preventing more costly and time consuming replacement of one or more top rails 101 and/or bottom rails 102. In some situations, this may also prevent the need to repair or replace one or more posts 103.

Breakaway bracket 114 may be made to withstand a varying amount of force before breaking. In one embodiment, breakaway bracket 114 may withstand shear stress equal or substantially equal to 1650 lbs. if the force is applied to breakaway bracket 114 and/or rails 101 and 102 from either side (e.g., a car running into tree guard 1000 head-on). In a preferred embodiment, breakaway bracket 114 may withstand shear stress of between 1,800-3,000 lbs. in that direction (from the side). In one embodiment, breakaway bracket may withstand shear stress equal or substantially equal to 360 lbs. if the force is applied to breakaway bracket 114 at or near a distal end of the horizontal member from the top such as, for example, from a person jumping on top rail 101 or bottom rail 102. In another embodiment, the breakaway bracket may withstand (before shearing) shear stress of between 380-450 lbs. applied in that direction (from the top). In alternative embodiments, breakaway bracket 114 may be made to withstand varying amounts of force depending on the type of material used to make breakaway bracket 114 and the dimension of the bracket.

In a particular embodiment, the preferred strength of the bracket (i.e., the shearing force it is designed to withstand) will depend on the strength of the tree guard rail with which the bracket is designed to be used. In a real world context, only a portion of the force applied directly to the rail will likely be transferred to a particular one of the two brackets at either end of the rail. Therefore, in a preferred embodiment, an individual bracket is designed to break when a force directly on the bracket is applied that is only a fraction of the force that would be required to deform the rail (this force amount required to deform the rail may be labeled "the rail deforming force amount"). In a preferred embodiment, the strength of the bracket is such that it can withstand force from a particular direction (e.g., from the side) that is equal to or between 15% and 40% that of the rail deforming force amount.

Various materials may be used for L-shaped breakaway brackets 114. However, in one embodiment, breakaway brackets 114 are made of 6063-T5 aluminum. In an alternative embodiment, breakaway brackets 114 may be made of T6 aluminum. Similarly, breakaway brackets 114 may be made from extruded or cast aluminum, or a non-metal material without necessarily departing from the spirit and scope of aspects of the present invention.

While the invention has been particularly described with respect to the illustrated embodiments, it will be appreciated that various alterations, modifications and adaptations may be made based on the present disclosure, and are intended to be within the scope of the invention. While the invention has been described in connection with what are presently considered to be the most practical and preferred embodiments, it is to be understood that the invention is not limited to the disclosed embodiments but only by the following claims.

What is claimed is:

1. A modular tree guard system comprising:
   a plurality of posts;
   a plurality of rails including at least one top rail and at least one bottom rail; and
   a plurality of L shaped breakaway brackets, each breakaway bracket of the plurality of breakaway brackets comprising a horizontal member extending substantially perpendicularly from a vertical member wherein:
   a rail of the plurality of rails is adapted to be coupled at a first rail end to a first post of the plurality of posts by a first breakaway bracket of the plurality of breakaway brackets and at a second rail end to a second post of the plurality of posts by a second breakaway bracket of the plurality of breakaway brackets; and
   at least one of the first and second breakaway brackets has a strength such that it will break along an intersection of the horizontal member and the vertical member and separate the rail and the horizontal member from a post of the first and second posts and the vertical member when a rail-deforming force amount that would otherwise be sufficient to deform the rail is applied to the rail in a first direction, and such that it will break along an intersection of the horizontal member and the vertical member and separate the rail and the horizontal member from the post of the first and second posts and the vertical member when the rail-deforming force amount that would otherwise be sufficient to deform the rail is applied to the rail in a second direction, the second direction being substantially perpendicular to the first direction.

2. The modular tree guard system of claim 1 wherein each breakaway bracket of the plurality of breakaway brackets comprises at least one fastener hole in the horizontal member and at least one fastener hole in the vertical member, wherein the at least one fastener hole in the horizontal member and the at least one fastener hole in the vertical member are adapted to receive tamper proof fasteners.

3. The modular tree guard system of claim 1, wherein the at least one of the first and second breakaway brackets is adapted to break when a force amount is applied to the at least one of the first and second breakaway brackets that is equal to or between 15% and 40% of the rail-deforming force amount.

4. The modular tree guard system of claim 1 wherein the plurality of breakaway brackets are made of extruded aluminum.

5. The modular tree guard system of claim 1 wherein the plurality of breakaway brackets are made of cast aluminum.

6. The modular tree guard system of claim 1 wherein each breakaway bracket of the plurality of breakaway brackets comprises a groove along the intersection of the horizontal member and the vertical member.

7. The modular tree guard system of claim 6 wherein each breakaway bracket is adapted to break along the groove when the rail-deforming force amount that would otherwise be sufficient to deform the rail is applied to the rail.

8. The modular tree guard system of claim 1, wherein the vertical member of the first breakaway bracket is coupled to the first post with a tamper proof fastener.

9. The modular tree guard system of claim 1, wherein the horizontal member of the first breakaway bracket is coupled to a bottom surface of the first rail end with a tamper proof fastener.

10. The modular tree guard system of claim 1 further comprising:
    a plurality of feet, each foot of the plurality of feet being adapted to be coupled with a post of the plurality of posts, the plurality of feet including a plurality of adjustable feet, each of the plurality of adjustable feet being adapted to couple with the post at any one of a plurality of coupling points and engage with a ground location, wherein a height of the first post coupled to a first adjustable foot engaged with a first ground location can be adjusted relative to a height of the second post coupled to a second adjustable foot engaged with a second ground location.

11. The modular tree guard system of claim 10 wherein the first and second ground locations are soft ground locations within a tree pit.

12. The modular tree guard system of claim 10 wherein the first and second ground locations are hard ground locations external to a tree pit.

13. The modular tree guard system of claim 1 wherein the vertical member is thinner and longer than the horizontal member.

14. An L shaped breakaway bracket for securing a rail to a post, the bracket comprising:
    a horizontal member extending substantially perpendicularly from a vertical member;
    at least one fastener hole in the horizontal member for receiving a first fastener for securing the horizontal member to the rail; and
    at least one fastener hole in the vertical member for receiving a second fastener for securing the vertical member to the post;
    wherein the bracket has a strength such that it will break along an intersection of the horizontal member and the vertical member and separate the rail and the horizontal member from the post and the vertical member when a force amount that would otherwise be sufficient to deform the rail ("rail deforming force amount") is applied to the rail in a first direction, and such that it will break along an intersection of the horizontal member and the vertical member and separate the rail and the horizontal member from the post and the vertical member when the rail-deforming force amount that would otherwise be sufficient to deform the rail is applied to the rail in a second direction, the second direction being substantially perpendicular to the first direction.

15. The breakaway bracket of claim 14 wherein the at least one fastener hole in the horizontal member and the at least one fastener hole in the vertical member are adapted to receive tamper proof fasteners.

16. The breakaway bracket of claim 14 wherein the breakaway bracket is made of extruded aluminum.

17. The breakaway bracket of claim 14 wherein the breakaway bracket is made of cast aluminum.

18. The breakaway bracket of claim 14 further comprising:
    a groove along the intersection of the horizontal member and the vertical member.

19. The breakaway bracket of claim 18 wherein the breakaway bracket is adapted to break along the groove when the rail-deforming force amount that would otherwise be sufficient to deform the rail is applied to the rail.

20. The breakaway bracket of claim 14, wherein the vertical member is coupled to the post with a tamper proof fastener, and the horizontal member is coupled to a bottom surface of a first end of the rail with a tamper proof fastener.

21. The breakaway bracket of claim 14, wherein the breakaway bracket is adapted to break when a force amount is applied to the bracket that is equal to or between 15% and 40% of the rail deforming force amount.

22. The breakaway bracket of claim 14 wherein the vertical member is thinner and longer than the horizontal member.

* * * * *